United States Patent
Kim et al.

(10) Patent No.: US 10,430,918 B2
(45) Date of Patent: Oct. 1, 2019

(54) DISPLAY DRIVER, DISPLAY SYSTEM, AND METHOD OF OPERATING THE DISPLAY DRIVER

(71) Applicant: SAMSUNG ELECTRONICS CO., LTD., Suwon-si, Gyeonggi-do (KR)

(72) Inventors: Yang-Hyo Kim, Suwon-si (KR); Soo-Young Woo, Hwaseong-si (KR); Do-Kyung Kim, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 159 days.

(21) Appl. No.: 14/736,413

(22) Filed: Jun. 11, 2015

(65) Prior Publication Data

US 2016/0027146 A1 Jan. 28, 2016

(30) Foreign Application Priority Data

Jul. 23, 2014 (KR) .................. 10-2014-0093504

(51) Int. Cl.
| | |
|---|---|
| *G06T 1/60* | (2006.01) |
| *G09G 3/32* | (2016.01) |
| *H04N 19/44* | (2014.01) |
| *G09G 3/36* | (2006.01) |
| *G09G 5/18* | (2006.01) |
| *G06T 11/60* | (2006.01) |
| *G09G 3/3208* | (2016.01) |
| *G06F 3/14* | (2006.01) |

(Continued)

(52) U.S. Cl.
CPC ............ *G06T 1/60* (2013.01); *G06F 3/14* (2013.01); *G06T 11/60* (2013.01); *G09G 3/3208* (2013.01); *G09G 3/3611* (2013.01); *G09G 3/3648* (2013.01); *G09G 5/005* (2013.01); *H04N 19/44* (2014.11); *G09G 5/18* (2013.01); *G09G 5/222* (2013.01); *G09G 2330/021* (2013.01); *G09G 2360/18* (2013.01); *G09G 2370/08* (2013.01)

(58) Field of Classification Search
CPC ........... G06T 1/60; G06T 11/60; H04N 19/44; G09G 5/18
See application file for complete search history.

(56) References Cited

U.S. PATENT DOCUMENTS

| | | |
|---|---|---|
| 5,559,554 A | 9/1996 | Uekane et al. |
| 6,091,459 A | 7/2000 | Masaike |

(Continued)

FOREIGN PATENT DOCUMENTS

| | | |
|---|---|---|
| CN | 1917609 | 2/2007 |
| CN | 101960485 | 1/2011 |

(Continued)

OTHER PUBLICATIONS

1st Office Action dated Jul. 4, 2018 in Corresponding Chinese Application No. 201510438013.1.

(Continued)

*Primary Examiner* — Michael Le
(74) *Attorney, Agent, or Firm* — F. Chau & Associates, LLC

(57) ABSTRACT

A display driver includes a first memory configured to store a plurality of pieces of image data, and an image generator configured to access the first memory based on display information and generate first display data based on the plurality of pieces of image data stored in the first memory.

19 Claims, 24 Drawing Sheets

(51) Int. Cl.
  *G09G 5/00* (2006.01)
  *G09G 5/22* (2006.01)

(56) References Cited

U.S. PATENT DOCUMENTS

| | | | |
|---|---|---|---|
| 6,483,510 B1* | 11/2002 | Jeong | G06T 11/203 |
| | | | 345/467 |
| 6,850,217 B2 | 2/2005 | Huang et al. | |
| 7,388,579 B2 | 6/2008 | O'Gorman et al. | |
| 7,446,776 B2 | 11/2008 | Clewett et al. | |
| 7,734,943 B2* | 6/2010 | Whelan | G09G 3/3611 |
| | | | 713/324 |
| 2003/0218682 A1* | 11/2003 | Lim | H04N 1/32101 |
| | | | 348/333.11 |
| 2007/0044138 A1 | 2/2007 | Yang et al. | |
| 2008/0043002 A1 | 2/2008 | Kaehler et al. | |
| 2008/0168286 A1* | 7/2008 | Tupman | G06F 1/3203 |
| | | | 713/320 |
| 2008/0307349 A1 | 12/2008 | Wang et al. | |
| 2009/0096798 A1 | 4/2009 | Bakalash et al. | |
| 2009/0225034 A1* | 9/2009 | Kida | G06F 3/0238 |
| | | | 345/171 |
| 2009/0225089 A1 | 9/2009 | Schreyer et al. | |
| 2010/0225640 A1 | 9/2010 | Vieri et al. | |
| 2011/0007084 A1* | 1/2011 | Park | G06F 3/1423 |
| | | | 345/549 |
| 2012/0072773 A1 | 3/2012 | Kang et al. | |
| 2012/0299831 A1 | 11/2012 | Lioy | |
| 2013/0033506 A1* | 2/2013 | Schreyer | G06T 15/005 |
| | | | 345/506 |
| 2013/0057763 A1* | 3/2013 | Cha | G09G 5/006 |
| | | | 348/554 |
| 2013/0264943 A1 | 10/2013 | Bora et al. | |
| 2014/0028710 A1* | 1/2014 | Baker | G06F 3/04886 |
| | | | 345/629 |
| 2014/0132800 A1 | 5/2014 | Onuma | |
| 2014/0375624 A1* | 12/2014 | Kanoh | G09G 5/18 |
| | | | 345/213 |

FOREIGN PATENT DOCUMENTS

| | | |
|---|---|---|
| JP | 03-195276 | 8/1991 |
| JP | 05-143040 | 6/1993 |
| JP | 07-154692 | 6/1995 |
| JP | 10-079898 | 3/1998 |
| JP | 2000-214837 | 8/2000 |
| JP | 2004-023492 | 1/2004 |
| JP | 2008-098741 | 4/2008 |
| JP | 2008-278103 | 11/2008 |
| JP | 2014-095798 | 5/2014 |

OTHER PUBLICATIONS

2nd Office Action dated Mar. 26, 2019 in Corresponding Chinese Application No. 201510438013.1.
1st Office Action dated Jan. 29, 2019 in Corresponding Japanese Application No. JP2015-145651.

* cited by examiner

DISPLAY DRIVER, DISPLAY SYSTEM, AND METHOD OF OPERATING THE DISPLAY DRIVER

CROSS-REFERENCE TO RELATED APPLICATIONS

This application claims priority under 35 U.S.C. § 119 to Korean Patent Application No. 10-2014-0093504, filed on Jul. 23, 2014, the disclosure of which is incorporated by reference herein in its entirety.

TECHNICAL FIELD

Exemplary embodiments of the present inventive concept relate to a display driver, a display system, and a method of operating the display driver.

DISCUSSION OF THE RELATED ART

An electronic device having an image display function such as, for example, a computer, a tablet PC, or a smartphone, includes a display system. The display system includes a display driver (e.g., a display driving IC (DDI)) and a host processor. The display panel includes a plurality of pixels and may be implemented as a flat panel display such as, for example, a liquid crystal display (LCD), an organic light emitting diode (OLED), etc. The display driver drives the display panel based on image data. Pixels are driven by a data signal (e.g., display data) provided by the display driver, resulting in an image being displayed on the display panel. The display driver may receive a control signal and the image data from the host processor. The host processor may regularly transmit the image data to the display driver. The host processor and the display driver may transmit and receive signals through a high speed interface.

SUMMARY

Exemplary embodiments of the inventive concept provide a display driver that reduces power consumption of a display system, the display system, and a method of operating the display driver.

According to an exemplary embodiment of the inventive concept, a display driver includes a first memory configured to store a plurality of pieces of image data, and an image generator configured to access the first memory based on display information and generate first display data based on the plurality of pieces of image data output from the first memory.

The plurality of pieces of image data may be a plurality of pieces of symbol image data or a plurality of pieces of frame image data.

In a first operation mode, a display panel may be driven based on the first display data generated by the image generator, and, in a second operation mode, the display panel may be driven based on second display data received from a host processor.

The display driver may further include a selector configured to receive the first display data and the second display data, select one of the first display data and the second display data based on a selection signal set according to an operation mode, and output the selected display data as display data corresponding to an image that is to be displayed on the display panel.

The display driver may further include a real time generator configured to generate time information, and provide the time information to the image generator as the display information.

The image generator may generate a watch image corresponding to the time information as the first display data every preset period.

The image generator may read a plurality of pieces of symbol image data corresponding to the display information from the first memory, synthesize the plurality of pieces of symbol image data, and generate the first display data.

The image generator may read a plurality of pieces of frame image data corresponding to the display information from the first memory, and output the plurality of pieces of frame image data as the first display data.

The image generator may synthesize second display data received from a host processor and symbol image data read from the first memory, and generate the first display data.

The image generator may include a memory controller configured to access the first memory based on the display information, and an image synthesizer configured to synthesize the plurality of pieces of image data read from the first memory and generate the first display data.

The plurality of pieces of image data may be compressed and stored in the first memory. The image generator may further include an image decoder configured to reconstruct the plurality of pieces of compressed image data output from the first memory.

The display information may be provided from the host processor.

The display information may be touch information of a touch detected on a touch panel and directly provided from a touch screen controller.

The display information may include time information, incoming phone call information, weather information, or remaining battery charge information.

The display driver may further include a second memory configured to store second display data provided from a host processor.

According to an exemplary embodiment of the inventive concept, a display system includes a display panel including a plurality of pixels, and a display driver configured to internally generate first display data and drive the display panel based on the first display data during a first display section.

The display system may further include a host processor configured to provide second display data and a command to the display driver. The display driver is configured to display the second display data on the display panel during a display section other than the first display section.

The host processor may provide symbol image data or frame image data to the display driver. The display driver is configured to store the symbol image data or the frame image data, and generate the first display data based on at least one of the symbol image data or the frame image data selected according to display information.

The host processor may update the symbol image data or the frame image data based on a user setting.

The host processor may operate in a sleep mode or a low speed mode during the first display section.

The host processor may provide the command including display information to the display driver during a predetermined display section. The display driver may generate the first display data based on the display information.

The display system may further include a touch screen configured to detect a touch, and a touch screen controller configured to generate a touch signal based on the detected touch and provide the touch signal to the display driver. The display driver is configured to generate the first display data based on the touch signal.

The display system may be mounted in a portable electronic device.

According to an exemplary embodiment of the inventive concept, a method of operating a display driver includes receiving a command indicating a first operation mode from a host processor, internally generating display data, and displaying the generated display data on a display panel.

Generating the display data may include receiving display information, outputting image data corresponding to the display information from a first memory, and generating the display data based on the image data output from the first memory.

The method may further include receiving a plurality of pieces of image data from the host processor, and storing the plurality of pieces of received image data in the first memory.

The method may further include receiving a command indicating a second operation mode from the host processor, receiving display data from the host processor, and displaying the received display data on the display panel.

According to an exemplary embodiment of the inventive concept, a display driver includes a command decoder configured to generate display information and a selection signal indicating a current operation mode, a first memory configured to store a plurality of pieces of image data, a second memory configured to store second display data provided from a host processor, an image generator configured to receive the display information from the command decoder, access the first memory based on the display information, and generate first display data based on the plurality of pieces of image data stored in the first memory, and a selector configured to receive the selection signal from the command decoder, receive the first display data from the image generator, receive the second display data from the second memory, select one of the first display data and the second display data based on the selection signal, and output the selected display data. The selected display data corresponds to an image that is to be displayed on a display panel.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
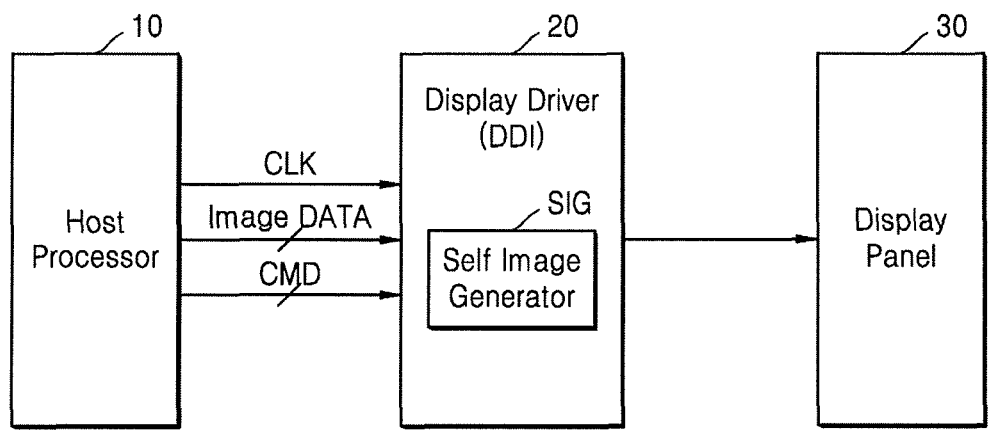
FIG. 1 is a block diagram of a display system according to an exemplary embodiment of the inventive concept.

Exemplary embodiments of the present inventive concept will be described more fully hereinafter with reference to the accompanying drawings. Like reference numerals may refer to like elements throughout the accompanying drawings.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concept.

It will be understood that when an element is referred to as being "on" or "contacting" another element, it may be directly on or contacting the other element or intervening elements may be present. Other expressions for describing relationships between elements such as, for example, "between" and "connecting" may also be understood likewise.

A display system according to various exemplary embodiments of the inventive concept may be an electronic device having an image display function. The electronic device may include, for example, at least one of a smartphone, a tablet personal computer (PC), a mobile phone, a conference phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses), electronic clothes, an electronic bracelet, an appcessory (e.g., a physical object that can be interacted with via a counterpart application installed on, for example, a mobile device), an electronic tattoo, and a smart watch.

According to exemplary embodiments, the display system may be a smart home appliance having an image display function. The smart home appliance may include at least one of, for example, a television, a digital video disc (DVD) player, an audio system, a refrigerator, an air conditioner, a cleaner, a microwave oven, a washing machine, an air cleaner, a set-top box, a TV box (e.g., SAMSUNG HOMESYNC, APPLE TV, or ANDROID TV by GOOGLE), a game console, an electronic dictionary, an electronic key, a camcorder, and an electronic picture frame.

According to exemplary embodiments, the display system may include at least one of various medical devices (e.g., magnetic resonance angiography (MRA), magnetic resonance imaging (MRI), computed tomography (CT), a photographing device, an X-ray device, etc.), a navigation system, a global positioning system (GPS) receiver, an event data recorder (EDR), a flight data recorder (FDR), a vehicle infotainment device, ship electronic equipment (e.g., a ship navigation system, a gyro compass, etc.), avionics, a security device, a vehicle head unit, an industrial or home robot, an automatic teller's machine (ATM) of a financial institution, and a point of sales (POS) device of a shop.

According to exemplary embodiments, the display system may include at least one of furniture or a part of a building/structure having an image display function, an electronic board, an electronic signature receiving device, a projector, or various measurement devices (e.g., water supply, electric power, gas, or electromagnetic measurement device). An electronic device including the display system according to various exemplary embodiments of the inventive concept may be one of the above-described various devices or a combination thereof. The display system may be, for example, a flexible device. The display system according to various exemplary embodiments of the inventive concept as described above is not limited thereto.

Exemplary embodiments of the present inventive concept will be described more fully hereinafter with reference to the accompanying drawings. Like reference numerals may refer to like elements throughout the accompanying drawings. The term "user" as used herein may refer to a person who uses a display system or a device (e.g., an artificial intelligence electronic device) that uses a display system according to exemplary embodiments of the present inventive concept.

Figure 2:
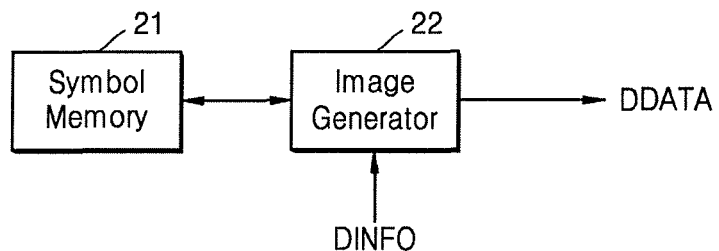
FIG. 2 is a block diagram of a self image generator included in a display driver according to an exemplary embodiment of the inventive concept.

FIG. 1 is a block diagram of a display system according to an exemplary embodiment of the inventive concept. FIG. 2 is a block diagram of a self image generator included in a display driver according to an exemplary embodiment of the inventive concept.

As described above, the display system 1000 may be a mobile device having an image display function such as, for example, a mobile phone, a smartphone, a tablet PC, a PDA, a wearable electronic device, or a PMP, a handheld device, or a handheld computer.

Referring to FIG. 1, the display system 1000 may include a host processor 10, a display driver 20 (e.g., a display driving IC (DDI)), and a display panel 30. According to an exemplary embodiment, the host processor 10 and the display driver 20 may be implemented as separate chips or may be implemented as a single module, a single system-on-chip (SoC), or a single package (e.g., a multi-chip package). According to an exemplary embodiment, the display driver 20 and the display panel 30 may be implemented as a single module.

The host processor 10 controls a general operation of the display system 1000. The host processor 10 may be implemented as, for example, an application processor (AP), a baseband processor (BBP), a microprocessing unit (MPU), etc.

The host processor 10 may transmit image data Image DATA and control signals used for an operation of the display driver 20 to the display driver 20. The transmitted image data Image DATA may include, for example, display data in a frame unit corresponding to an image that is to be displayed on the display panel 30 and predetermined image data that may be stored in the display driver 20. The predetermined image data may be symbol image data such as, for example, characters, numbers, or symbols that are used as a part of images or image data in a frame unit corresponding to an image that is expected to be displayed on the display panel 30. The predetermined image data may be used when the display driver 20 generates the display data. Thus, the predetermined image data may refer to reference image data.

The host processor 10 may transmit the reference image data to the display driver 20 before a display section, for example, a power-on section of the display system 1000 or a system initialization section. The host processor 10 may transmit the reference image data to the display driver 20 before or after transmitting the display data in the frame unit corresponding to the image that is to be displayed. When a symbol image is changed, for example, by a font change operation of a user, the host processor 10 may transmit symbol image data corresponding to the changed symbol to the display driver 20 and update symbol image data stored in the display driver 20.

The control signals may include a clock signal CLK, a command signal CMD, a horizontal sync signal, a vertical sync signal, a data enable signal, etc. The image data and the control signals may be provided to the display driver 20 as, for example, packet data.

The command signal CMD may include a signal that controls an operating mode (e.g., a display mode) of the display driver 20, display information, display environment setting information, etc.

The signal that controls the operating mode my include, for example, a moving image (e.g., video) display mode, a still image display mode, a low and high speed operating mode, a self image generation mode, and an image receiving mode.

The display information is information indicating elements of the image that is to be displayed on the display panel 30 including, for example, time information, temperature information, weather information, incoming phone call information, etc. The display environment setting information may include, for example, a frame rate, a gamma setting value, a brightness setting value, etc.

In an exemplary embodiment, the host processor 10 may not transmit the image data Image DATA to the display driver 20 after transmitting the control signal indicating the self image generation mode to the display driver 20. The host processor 10 may maintain a sleep status or operate at low speed.

The display driver 20 may drive the display panel 30 based on the image data Image DATA and the control signals that are received from the host processor 10. The display driver 20 may convert the image data Image DATA, which includes digital signals, into analog signals, and drive the display panel 30 using the analog signals.

The display driver 20 may include a self image generator SIG, and may generate display data corresponding to the image that is to be displayed on the display panel 30. When the display panel 30 operates in a first operating section or a first operating mode that is set by the command signal CMD received from the host processor 10, the display driver 20 may display the image on the display panel 30 based on the internally generated display data without receiving the image data Image DATA from the host processor 10. When the image that is to be displayed on the display panel 30 is a typical image or a predictably modifiable image, the host processor 10 may generate the command signal CMD that sets the display driver 20 to operate in the first operating mode and may transmit the command signal CMD to the display driver 20.

As described above, the display driver 20 may receive and store the reference image data from the host processor 10. The reference image data may be, for example, symbol image data or frame image data. The self image generator SIG may generate display data using the reference image data.

Referring to FIG. 2, the self image generator SIG may include a first memory 21 and an image generator 22. The first memory 21 stores the reference image data. The first memory 21 may refer to a symbol memory. The first memory 21 may include a volatile memory such as, for example, a dynamic random access memory (DRAM) or a static random access memory (SRAM), a non-volatile memory such as, for example, read only memory (ROM), a resistive random access memory (ReRAM), or a magnetic random access memory (MRAM).

The image generator 22 may access the first memory 21 based on display information DINFO. As described above, the display information DINFO is information indicating elements of the image that is to be displayed on the display panel 30, and may include, for example, time information, temperature information, weather information, or incoming phone call information. The display information DINFO may include data indicating a type of information such as, for example, a value indicating whether the information is time information, temperature information, weather information, or incoming phone call information. For example, when the information is time information, the display information DINFO may include a data value corresponding to a specific time to be displayed, and when the information is weather information, the display information DINFO may include a data value indicating a specific status such as, for example, "sunny," "cloudy," "rain," "clear," etc. The image generator 22 may generate display data DDATA using image data output from the first memory 21.

Referring to FIG. 1, the display driver 20 may cause an image based on the display data received from the host processor 10 to be displayed on the display panel 30, or may cause an image based on the display data generated by the self image generator SIG to be displayed on the display panel 30 according to the operating mode set by the host processor 10.

The display panel 30 may include a plurality of pixels arranged in a matrix form and may display an image in a frame unit. The display panel 30 may be implemented as one of, for example, a liquid crystal display (LCD), a light emitting diode (LED) display, an organic LED (OLED) display, an active-matrix OLED (AMOLED) display, an Electrochromic Display (ECD), a Digital Mirror Device (DMD), an Actuated Mirror Device (AMD), a Grating Light Value (GLV), a Plasma Display Panel (PDP), an Electro Luminescent Display (ELD), a Vacuum Fluorescent Display (VFD), or any other type of flat panel display or flexible display.

The display system 1000 according to an exemplary embodiment of the inventive concept may reduce a load of the host processor 10 since the display driver 20 internally generates the display data and drives the display panel 30 based on the display data. Power consumption of the display system 1000 may be reduced since the host processor 10 operates at a low speed and/or maintains a sleep status while displaying the image on the display panel 30.

Figure 3:
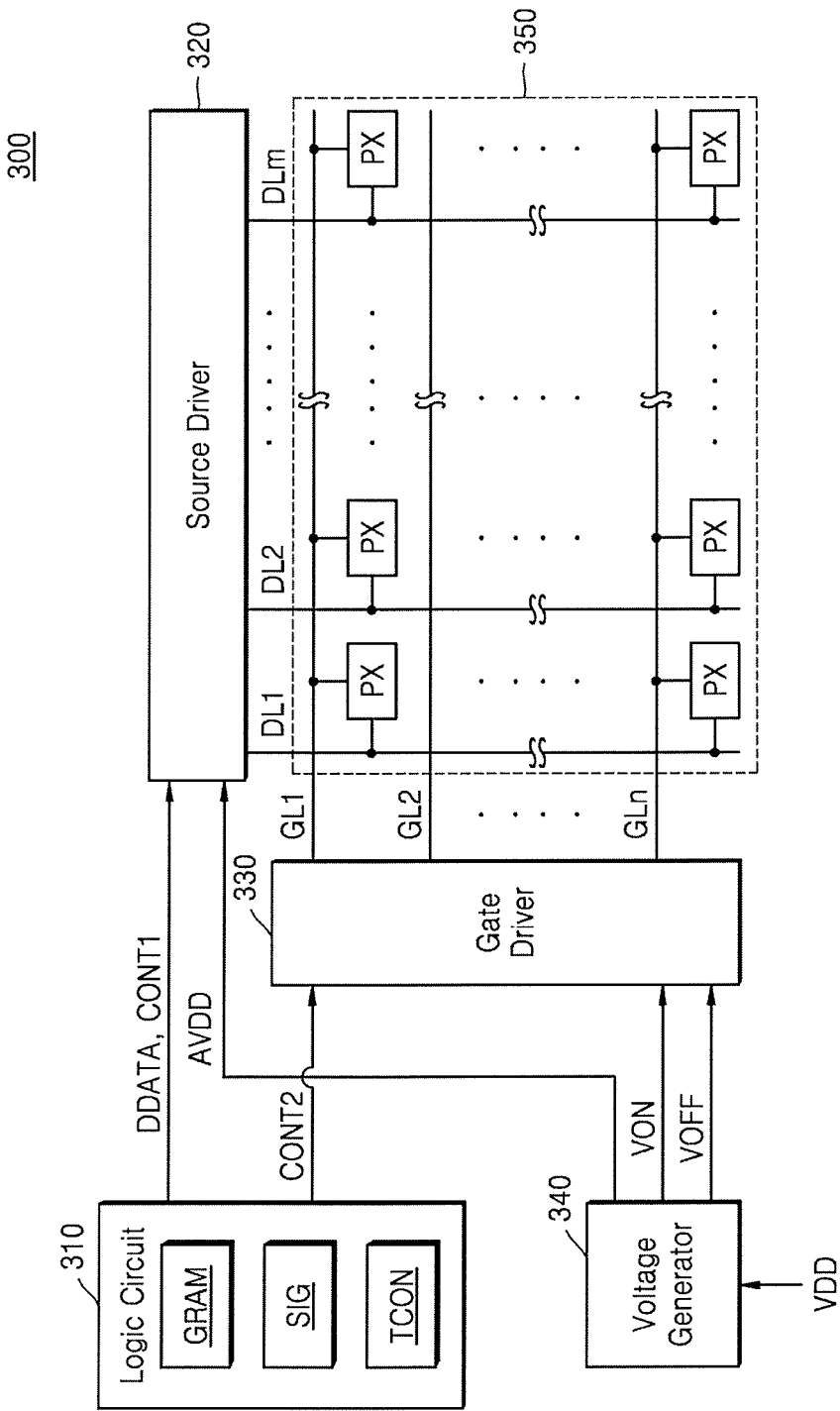
FIG. 3 is a block diagram of a display device including a display driver according to an exemplary embodiment of the inventive concept.

FIG. 3 is a block diagram of a display device 300 including a display driver according to an exemplary embodiment of the inventive concept.

Referring to FIG. 3, the display device 300 may include a display panel 350 and a plurality of driving circuits 310-340. The driving circuits 310-340 may include a logic circuit 310, a source driver 320, a gate driver 330, and a voltage generator 340. The driving circuits 310-340 may be elements of the display driver 20 of FIG. 1. According to exemplary embodiments, the driving circuits 310-340 may be formed as a single semiconductor chip or as separate semiconductor chips. In an exemplary embodiment, the gate driver 330 may be formed on a substrate of the display panel 350.

The display device 300 may be one of various flat panel display devices including, for example, a liquid crystal display (LCD), an organic light emitting diode (OLED), a plasma display panel (PDP), etc., as well as any of the flat panel display devices described above. For convenience of description, the display device 300 will be described herein as being an LCD device, however, exemplary embodiments are not limited thereto.

The display panel 350 includes a plurality of gate lines GL1-GLn, a plurality of data lines/source lines DL1-DLm arranged in a direction crossing the gate lines GL1-GLn, and pixels PX arranged in locations at which the gate lines GL1-GLn and the data lines DL1-DLm cross each other. When the display device 300 is an LCD device, each of the pixels PX may include a transistor including a gate electrode and a source electrode, respectively, connected to the gate lines GL1-GLn and the data lines DL1-DLm, and a liquid crystal capacitor and a storage capacitor that are connected to a drain electrode of the transistor. According to an exemplary embodiment, the display panel 350 may be a flexible display panel.

The logic circuit 310 may generate the display data DDATA based on image data and control signals received from outside of the display device 300. The logic circuit 310 may include the self image generator SIG and a timing controller TCON. The logic circuit 310 may further include a graphic RAM GRAM.

The self image generator SIG may include the first memory 21 and the image generator 22 as shown in FIG. 2, and may generate the display data DDATA that is to be displayed on the display panel 350 based on image data output by accessing the memory 21.

The graphic RAM GRAM may store the display data DDATA of at least one frame received from an external device such as, for example, the host processor 10 as shown in FIG. 1, and may output the display data DDATA at an appropriate timing. The timing controller TCON may generate control signals CONT1 and CONT2 for controlling driving timing of the source driver 320 and the gate driver 330. The timing controller TCON may output the display data DDATA output from the graphic RAM GRAM or the self image generator SIG to the source driver 320 in a line unit, or may convert the display data DDATA in accordance with an interface specification of the source driver 320 and output the converted display data DDATA to the source driver 320.

The source driver 320 drives the data lines DL1~DLm of the display panel 350 based on the received display data DDATA and a timing signal (e.g., the first control signal CONT1). The source driver 320 may convert the display data DDATA into analog signals and output the converted signals to the data line DL1~DLm. The converted signals may be, for example, a gradation voltage corresponding to the display data DDATA.

The gate driver 330 may sequentially scan the gate lines GL1~GLn based on the timing signal (e.g., the second control signal CONT2). The gate driver 330 may activate a selected gate line by applying a gate-on-voltage VON to the selected gate line. The source driver 320 outputs a gradation voltage corresponding to the pixels connected to the activated gate line. Accordingly, an image may be displayed on the display panel 350 in a horizontal line unit (e.g., line by line).

The voltage generator 340 may receive a power voltage VDD from outside of the display device 300 and may generate a voltage used by the display device 300 such as, for example, an analog power voltage AVDD, the gate-on-voltage VON, and a gate-off-voltage VOFF. The voltage generator 340 may generate various voltages in addition to the illustrated voltages according to the type of the display device 300.

Figure 4:
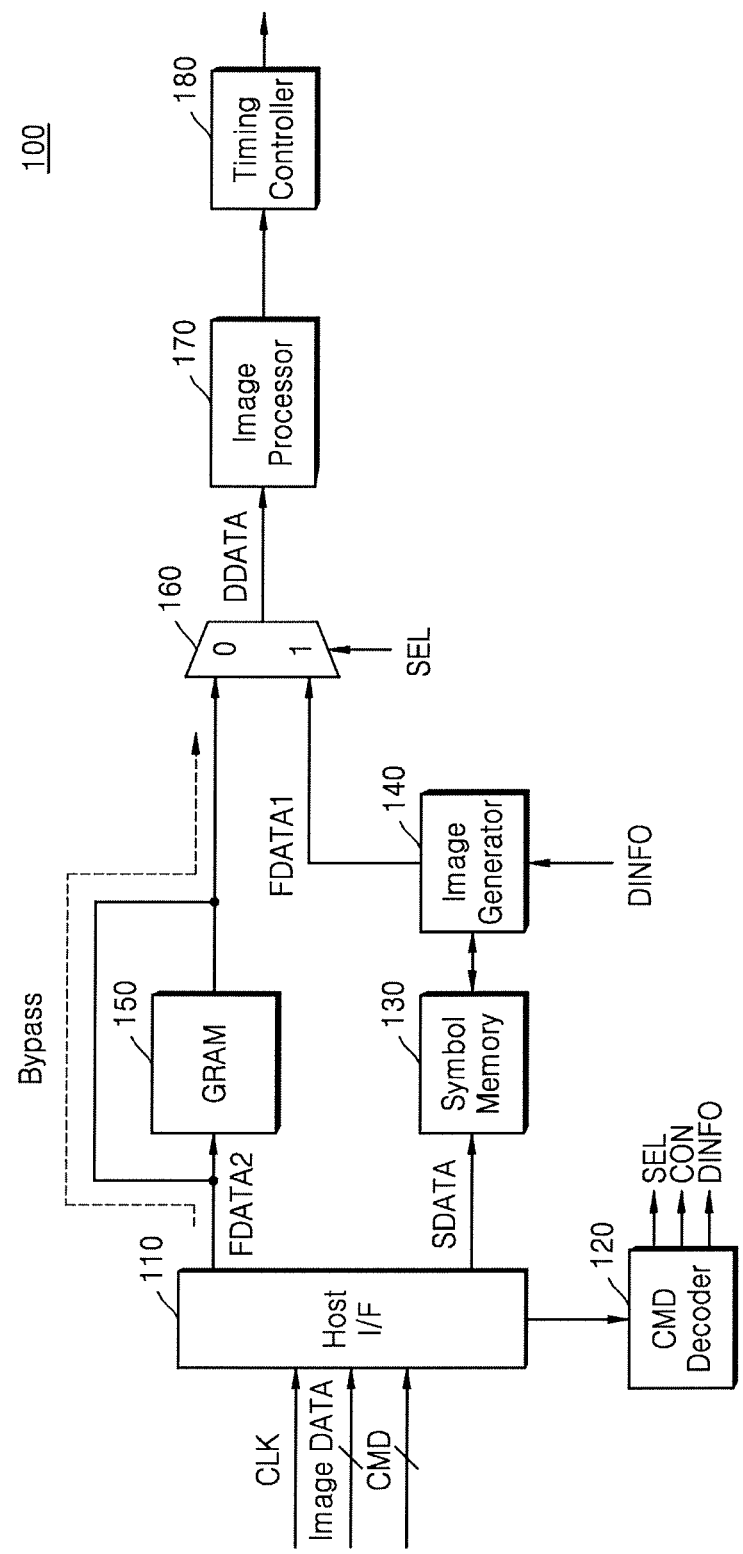
FIG. 4 is a block diagram of a display driver according to an exemplary embodiment of the inventive concept.
Figure 5A:
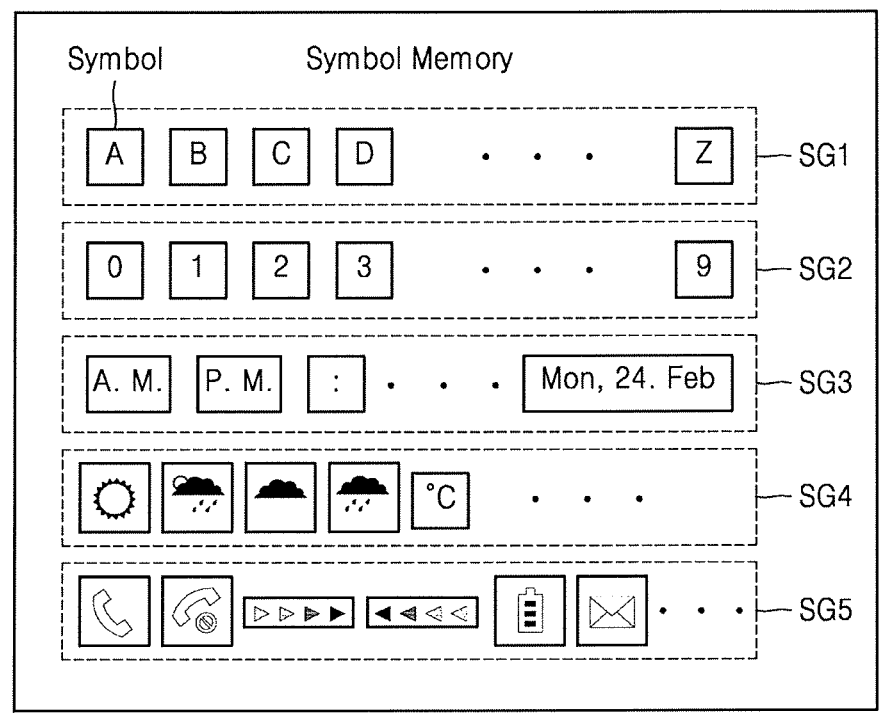
FIGS. 5A and 5B illustrate examples of image data stored in a first memory according to exemplary embodiments of the inventive concept.
Figure 5B:
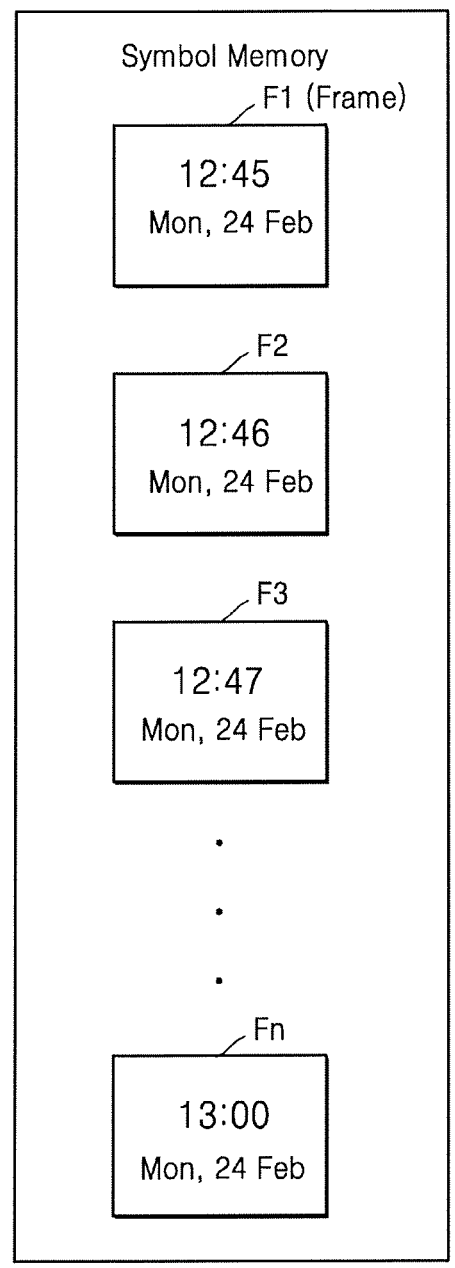

FIG. 4 is a block diagram of a display driver 100 according to an exemplary embodiment of the inventive concept. The display driver 100 of FIG. 4 is an example of the display driver 20 of FIG. 1. FIGS. 5A and 5B illustrate examples of image data stored in a first memory (e.g., the first memory 21 of FIG. 2) according to exemplary embodiments of the inventive concept. FIG. 5A illustrates an example of symbol image data, and FIG. 5B illustrates an example of frame image data.

Referring to FIG. 4, the display driver 100 may include a host interface 110, a command decoder 120, a first memory 130 (e.g., a symbol memory), an image generator 140, and a timing controller 180. According to an exemplary embodiment, the display driver 100 may further include a second memory 150 (e.g., a graphic RAM GRAM), a selector 160 (e.g., a multiplexer), and/or an image processor 170.

The host interface 110 may transmit or receive a signal(s) to or from a host processor (e.g., the host processor 10 of FIG. 1). The host interface 110 may be implemented as, for example, an RGB interface, a CPU interface, or a serial interface. According to exemplary embodiments, the host interface 110 may be implemented as one of a mobile display digital interface (MDDI), an inter integrated circuit (I2C) interface, a serial peripheral interface (SPI), a micro controller unit (MCU), a mobile industry processor interface (MIPI), an embedded display port (eDP) interface, or a high definition multimedia interface (HDMI). In addition, various high speed interfaces may be applied as the host interface 110.

The host interface 110 may receive the clock signal CLK, the image data Image DATA, and the command signal CMD through communication with the host processor 10. For example, when the image data Image DATA and the command signal CMD are transmitted as packet data, the host interface 110 may reconstruct the image data Image DATA and the command signal CMD from the packet data based on the clock signal CLK. The host interface 110 may provide reconstructed signals to the first or second memory 130 or 150 and the command decoder 120.

According to an exemplary embodiment, the host interface 110 may transmit a tearing control signal to the host processor 10 to prevent a tearing effect of an image displayed on the display panel 30. The host processor 10 may determine a time at which the image data Image DATA is to be transmitted to the display driver 100 based on the tearing control signal.

The command decoder 120 may generate signals such as, for example, a selection signal SEL, a control signal CON, and the display information DINFO for controlling circuits of the display driver 100 based on the command signal CMD received from the host interface 110. Although the control signal CON is illustrated as a single signal in FIG. 4, the control single CON may be a plurality of signals respectively corresponding to different circuits. The control signal CON may be a signal controlling an operation of at least one of circuits included in the display driver 100 such as, for example, the first memory 130, the image generator 140, the timing controller 180, the second memory 150, the selector 160, and the image processor 170. For example, the control signal CON may be a signal controlling operation timing, an operation environment setting value, or an operation mode selection signal.

As described above, the display information DINFO may be information indicating elements of an image that is to be displayed on the display panel 30 such as, for example, time information, temperature information, weather information, or incoming phone call information.

The first memory 130 may store reference image data, symbol image data frequently used in an image such as, for example, numbers or symbols, or image data in a frame unit according to an image that is expected to be subsequently displayed on the display panel 30. Hereinafter, the reference image data stored in the first memory 130 is referred to as symbol data SDATA.

Referring to FIG. 5A, the first memory 130 may store symbol image data Symbol. In an exemplary embodiment, the symbol image data Symbol may include character symbols SG1, number symbols SG2, symbols SG3 indicating a time or data, and symbols SG4 indicating weather or temperature. In addition, various other symbols may be included according to the type of an electronic appliance including the display system 1000 including the display driver 100. For example, when the display system 1000 includes a smartphone, a smartwatch, etc., symbols SG5 such as, for example, incoming phone call information, message information, a remaining battery level, etc. may be stored.

Referring to FIG. 5B, the first memory 130 may store image data Frame in a frame unit. For example, when a time image (e.g., a watch image) is displayed on the display panel 30, the time image may be renewed on a preset time basis such as, for example, on a minute-by-minute basis or on a second-by-second basis. As shown in FIG. 5B, the first memory 130 may store frame image data F1~Fn corresponding to the time image renewed on the minute basis.

It is to be understood that the images of FIGS. 5A and 5B are merely examples. Various types of the symbol data SDATA may be stored and may be provided from the host processor 10. According to an exemplary embodiment, the symbol data SDATA may be compression data.

Referring again to FIG. 4, the image generator 140 may access the first memory 130 based on the display information DINFO and may generate display data in the frame unit based on the image data output by the first memory 130. The display data generated by the image generator 140 may be referred to as first display data FDATA1. The display data in the frame unit provided from the host processor 10 may be referred to as second display data FDATA2. When the image generator 140 operates in a first operation mode, for example, a self image generation mode, the image generator 140 may generate the first display data FDATA1.

The second memory 150 may store and output the second display data FDATA2 provided from the host processor (e.g., the host processor 10 of FIG. 1). The second display data FDATA2 output by the second memory 150 may be transmitted to the selector 160. The second memory 150 may be referred to as a graphic RAM GRAM or a frame memory. The second memory 150 may include a volatile memory such as, for example, a DRAM and an SRAM, or a non-volatile memory such as, for example, a ROM, a ReRAM, and an MRAM.

According to an exemplary embodiment, the first memory 130 and the second memory 150 may be the same physical memory device. In this case, the first memory 130 and the second memory 150 may correspond to different storage regions of the memory device.

In an exemplary embodiment, the second display data FDATA2 may not be stored in the second memory 150 and may be directly transmitted to the selector 160. For example, the second display data FDATA2 may bypass the second memory 150. Whether the second display data FDATA2 is output by being stored in or bypassing the second memory 150 may be determined, for example, according to the type of the second display data FDATA2 or an operation mode. For example, when the second display data FDATA2 is data corresponding to a moving image (e.g., a video), and the display driver 100 operates in a moving image (e.g., video) mode, the second display data FDATA2 may bypass the second memory 150. When the second display data FDATA2 is data corresponding to a still image, and the display driver 100 operates in a still image mode, the second display data FDATA2 may be output by being stored in the second memory 150. However, exemplary embodiments are not limited thereto. According to an exemplary embodiment, the display driver 100 may not include the second memory 150, and the second display data FDATA2 may be directly transmitted to the selector 160.

The selector 160 may select one of the first display data FDATA1 and the second display data FDATA1 according to the selection signal SEL and may output the selected display data as the display data DDATA. For example, if the selection signal is a first level, for example, a low level, the selector 160 may select the second display data FDATA2, and if the selection signal is a second level, for example, a high level, the selector 160 may select the first display data FDATA1. The selection signal SEL may be determined according to an operation mode of the display driver 100 set by the host processor (e.g., the host processor 10 of FIG. 1). For example, if the command signal CMD that sets the first operation mode, for example, the self image generation mode, is received from the host processor 10, the command decoder 120 may generate and provide the selection signal SEL of the second level to the selector 160, and if the command signal CMD that sets another operation mode is received from the host processor 10, the command decoder 120 may generate and provide the selection signal SEL of the first level to the selector 160.

The image processor 170 may perform image processing on the display data DDATA that is output from the selector 160. For example, the image processor 170 may compensate for an image corresponding to the display data DDATA by using various image quality compensation algorithms including, for example, a digital nature image engine (DNIe) algorithm, a dynamic backlight control (DBLC) algorithm, a contents adaptive backlight control (CABC), etc. The image processor 170 may scale a data value of the display data DDATA or change the data value as another value by using the algorithms to compensate for gamma, brightness, chroma, a color, etc. of the image corresponding to the display data DDATA.

The timing controller 180 may convert and transmit the display data DDATA output from the image processor 170 into a line unit or another format to the source driver (e.g., the source driver 320 of FIG. 3).

Figure 6:
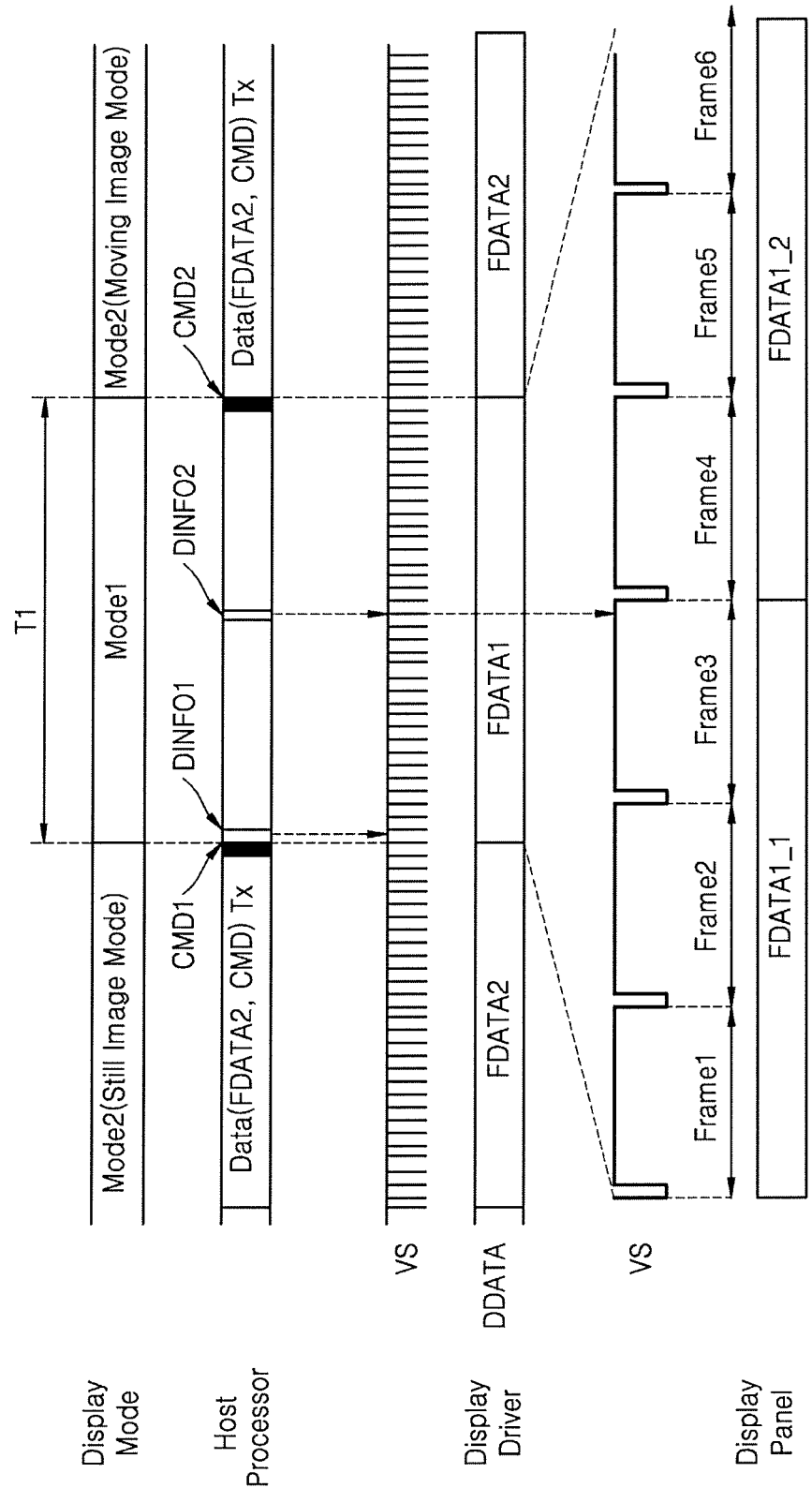
FIG. 6 is a timing diagram illustrating an operation of a display system including the display driver of FIG. 4 according to an exemplary embodiment of the inventive concept.

FIG. 6 is a timing diagram illustrating an operation of a display system including the display driver 100 of FIG. 4 according to an exemplary embodiment of the inventive concept.

Referring to FIG. 6, a display mode may include a first operation mode Mode1 and a second operation mode Mode2.

In an exemplary embodiment, the first operation mode Mode1 is an operation mode in which the display driver 100 internally generates display data and operates a display panel based on the generated display data. For example, when a typical image such as a time image, an incoming phone call image, a weather image, a temperature image, a number, a character, an expectable image, etc. is displayed on the display panel, the host processor (e.g., the host processor 10 of FIG. 1) may transmit a first command signal CMD1 to the display driver 100, and the display driver 100 may operate in the first operation mode Mode1 in response to receiving the first command signal CMD1.

The second operation mode Mode2 is an operation mode in which the display driver 100 drives the display panel 30 based on display data transmitted by the host processor 10. For example, when an unexpectable image such as a photo, a moving image (e.g., a video), etc. is displayed on the display panel 30, the host processor 10 may transmit a second command signal CMD2 to the display driver 100, and the display driver 100 may operate in the second operation mode Mode2 in response to receiving the second command signal CMD2. The display driver 100 may receive the second display data FDATA2 from the host processor 10 and may drive the display panel 30 based on the second display data FDATA2.

In a section in which the display driver 100 operates in the first operation mode Mode1 (e.g., a section T1), the host processor 10 does not transmit image data (e.g., the second display data FDATA2) to the display driver 100. The display driver 100 may internally generate the first display data FDATA1 and may drive the display panel 30 based on the display data FDATA1. In the section T1, the host processor 10 may transmit the command signal CMD. First display information DINFO1 and second display information DINFO2 may be transmitted to the display driver 100 as a type of the command signal CMD. The display driver 100 may generate a plurality of pieces of first display data FDATA1_1 and FDATA1_2 based on the first display information DINFO1 and the second display information DINFO2. Frame sections Frame1~Frame6 displayed as parts of an image may be identified, for example, based on a vertical sync VS signal. An image corresponding to first display data FDATA1_1 generated based on the first display information DINFO1 may be displayed on the display panel 30 in the first through third frame sections Frame1~Frame3 included in the section T1 in which the display driver 100 operates in the first operation mode Mode1, and new first display data FDATA1_2 generated based on the second display information DINFO2 may be displayed on the display panel 30 in the fourth through sixth frame sections Frame4~Frame6.

Figure 7A:
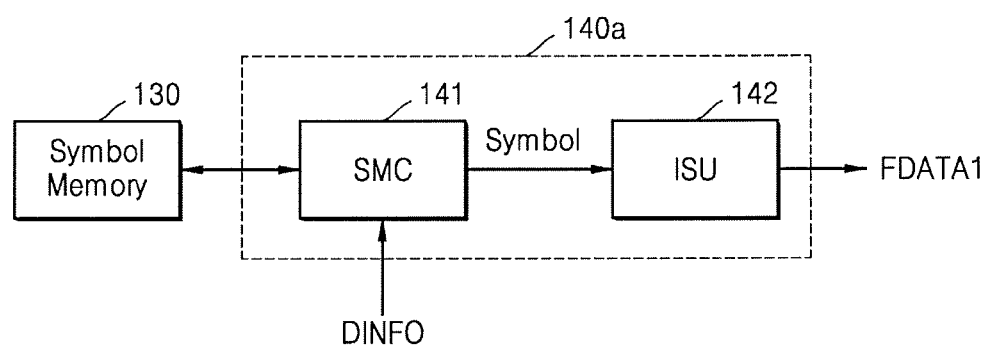
FIGS. 7A through 7C are block diagrams of examples of image generators according to exemplary embodiments of the inventive concept.
Figure 7B:
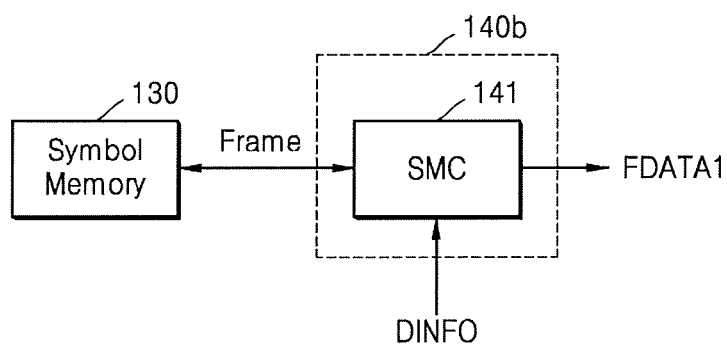
Figure 7C:
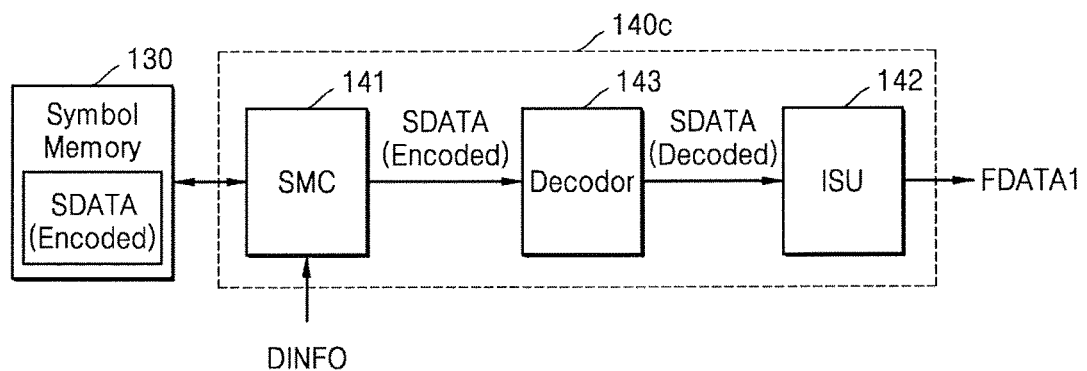

FIGS. 7A through 7C are block diagrams of examples of image generators 140*a*, 140*b*, and 140*c*, respectively, according to exemplary embodiments of the inventive concept. The image generator 140 of FIG. 4 may be implemented as one of the image generators 140*a*, 140*b*, and 140*c*. The first memory 130 is illustrated in FIGS. 7A through 7C for convenience of description.

Referring to FIG. 7A, the image generator 140*a* may include a memory controller SMC 141 and an image synthesizer ISU 142. The memory controller SMC 141 may access the first memory 130 based on the display information DINFO, and may read a plurality of pieces of image data corresponding to the symbols Symbol (e.g., a plurality of pieces of symbol image data). The memory controller SMC 141 may determine which image data is to be obtained according to the display information DINFO, and may access an address of the first memory 130 that stores the image data that is to be obtained.

The image synthesizer ISU 142 may synthesize the symbol image data and may generate the first frame data FDATA1. The image synthesizer ISU 142 may include, for example, a graphic engine for rendering the symbol image data.

Referring to FIG. 7B, the image generator 140*b* may include only the memory controller SMC 141. For example, when image data stored in the first memory 130 is frame image data as shown in FIG. 5B, the memory controller SMC 141 may access the first memory 130 based on the display information DINFO, read frame image data Frame, and output the read frame image data Frame as the first display data FDATA1.

Referring to FIG. 7C, the image generator 140*c* may include the memory controller SMC 141, the image synthesizer ISU 142, and a decoder 143. When symbol data stored in the first memory 130 is compression data, symbol data read by the memory controller SMC 141 is also compression data. Thus, the decoder 143 may decode and reconstruct the compressed symbol data, and the image synthesizer ISU 142 may synthesize the reconstructed symbol data and generate the first display data FDATA1. According to an exemplary embodiment, the image generator 140*c* may not include the image synthesizer 142. For example, when the reconstructed symbol data is frame image data, the frame image data may be output as the first display data FDATA1.

An example of an operation of the image generator 140*a*, the first display data FDATA1 generated according to the operation, and a change in an image displayed on a display panel, will be described in detail with reference to FIGS. 8A through 8C below.

Figure 8A:
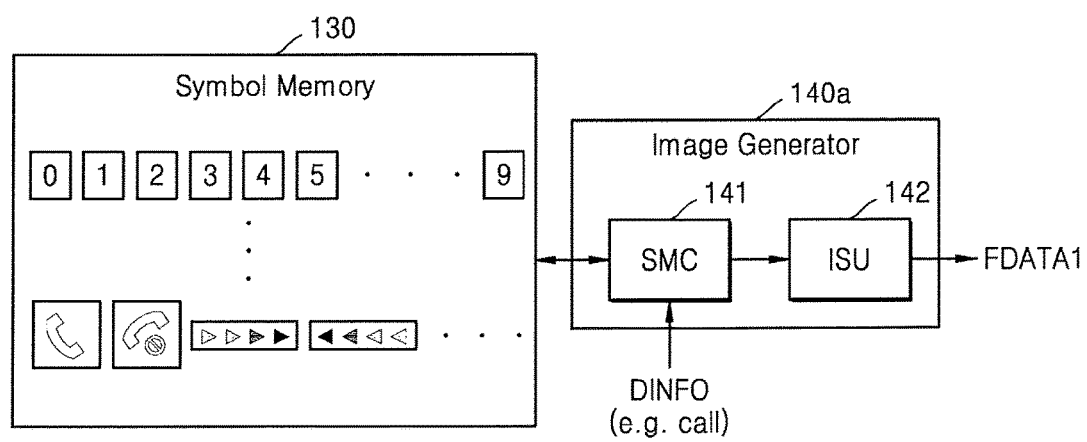
FIG. 8A illustrates an example of an operation of an image generator according to an exemplary embodiment of the inventive concept.
Figure 8B:
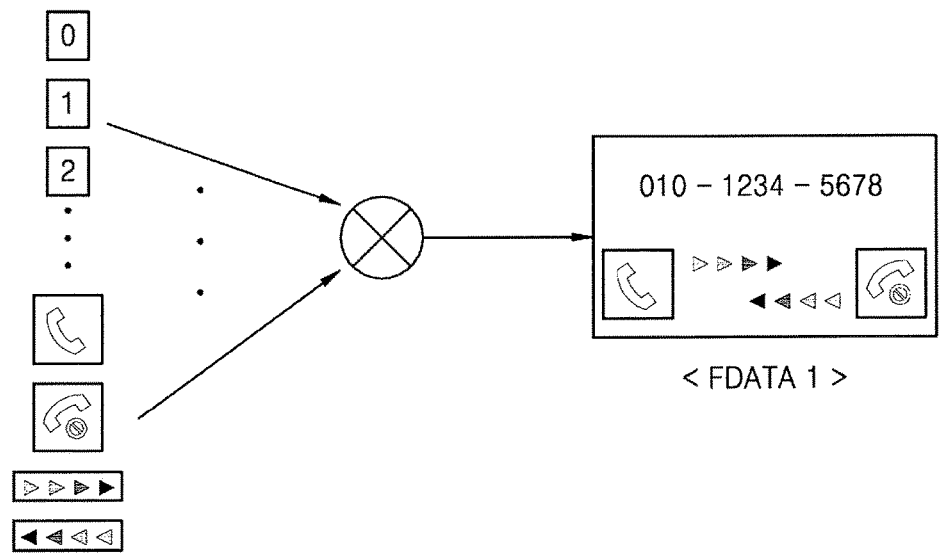
FIG. 8B illustrates an example of display data generated according to the operation of the image generator of FIG. 8A according to an exemplary embodiment of the inventive concept.

FIG. 8A illustrates an example of an operation of the image generator 140*a* according to an exemplary embodiment of the inventive concept. FIG. 8B illustrates an example of the first display data FDATA1 generated according to the operation of the image generator 140*a* of FIG. 8A according to an exemplary embodiment of the inventive concept. FIG. 8C illustrates an image corresponding to the first display data FDATA1 of FIG. 8B displayed on a display panel according to an exemplary embodiment of the inventive concept.

A case in which a display system (e.g., the display system 1000 of FIG. 1) according to an exemplary embodiment of the inventive concept is an electronic device having a phone call function, and an incoming phone call image is displayed on the display panel that is displaying a watch image when the electronic device receives the phone call will be described.

Referring to FIG. 8A, incoming phone call information may be provided to the image generator 140*a* as the display information DINFO. The incoming phone call information may include data indicating that the phone call image needs to be displayed, information regarding a received phone call number, etc. The display information DINFO may be provided from the host processor 10.

The memory controller SMC 141 may determine symbol image data including images that are to be displayed on the display panel such as, for example, a plurality of numbers, symbols, etc. based on the display information DINFO. The memory controller SMC 141 may access the first memory 130 and read the symbol image data. The image synthesizer ISU 142 may synthesize the read symbol image data and generate the first display data FDATA1, as shown in FIG. 8B. The first display data FDATA1 may correspond to the phone call image.

Figure 8C:
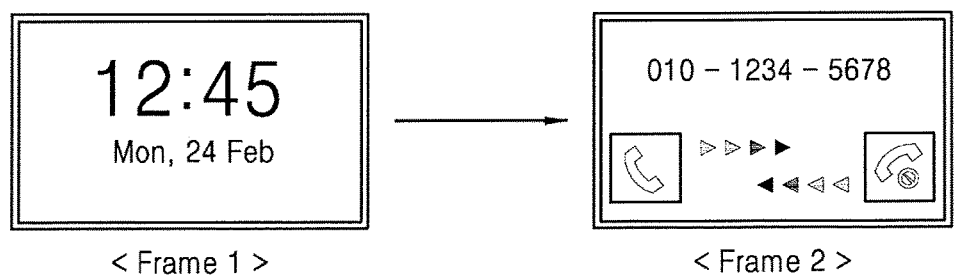
FIG. 8C illustrates an image corresponding to the display data of FIG. 8B displayed on a display panel according to an exemplary embodiment of the inventive concept.

Referring to FIG. 8C, the display panel displays a watch image Frame 1 and then an image corresponding to the first display data FDATA1 generated by the image generator 140*a* of the display driver 100 (e.g., a phone call image Frame 2).

Figure 9:
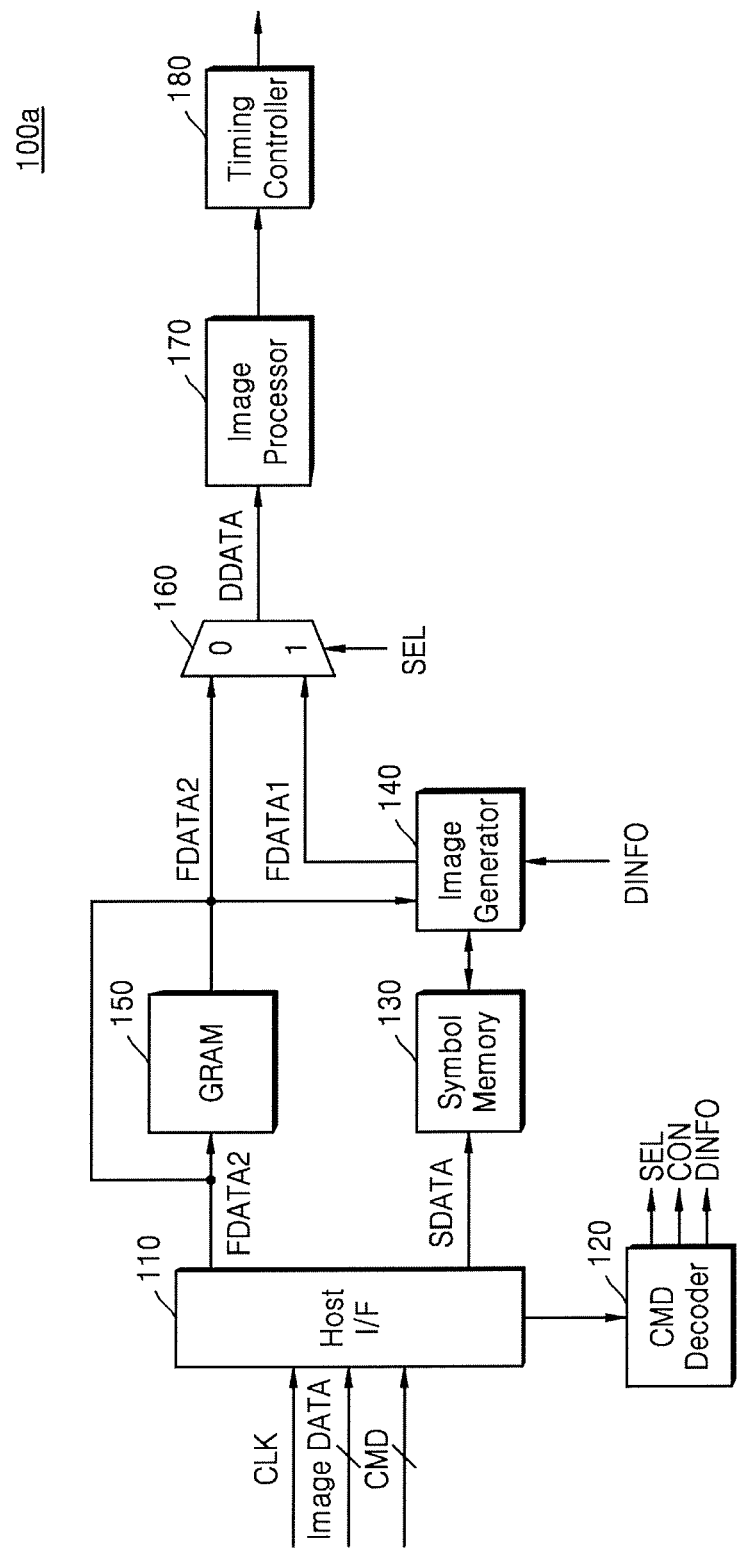
FIG. 9 is a block diagram of a display driver according to an exemplary embodiment of the inventive concept.

FIG. 9 is a block diagram of a display driver 100*a* according to an exemplary embodiment of the inventive concept. The display driver 100*a* of FIG. 9 is a modified version of the display driver 100 of FIG. 4. Thus, for convenience of explanation, a redundant description of elements and processes previously described may be omitted herein.

Referring to FIG. 9, the second display data FDATA2 may be provided to the image generator 140. According to an exemplary embodiment, the second display data FDATA2 provided to the image generator 140 may be the display data DDATA that is finally output before the display driver 100*a* operates in a first operating mode. The image generator 140 may generate the first display data FDATA1 based on image data read from the first memory 130 and the second display data FDATA2.

Figure 10:
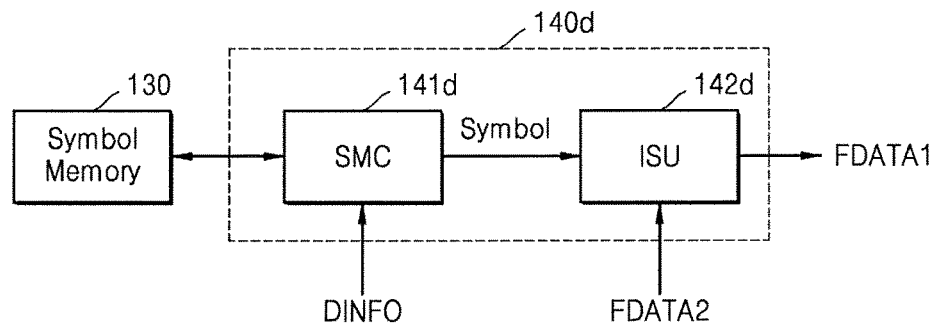
FIG. 10 is a block diagram of an image generator according to an exemplary embodiment of the inventive concept.

FIG. 10 is a block diagram of an image generator 140d according to an exemplary embodiment of the inventive concept. The image generator 140d of FIG. 10 may be the image generator 140 included in the display driver 100a of FIG. 9.

Referring to FIG. 10, the image generator 140d may include a memory controller SMC 141d and an image synthesizer ISU 142d. Operations of the memory controller SMC 141d and the image synthesizer ISU 142d are similar to those of the memory controller SMC 141 and the image synthesizer ISU 142 of FIG. 7A. For convenience of explanation, a further description thereof may be omitted herein. The memory controller 141d may read at least one piece of image data from the first memory 130 (e.g., the symbol image data Symbol), based on the display information DINFO. The at least one piece of symbol image data Symbol may be provided to the image synthesizer ISU 142d. The at least one piece of symbol image data Symbol and the second display data FDATA2 may be provided to the image synthesizer ISU 142d. The image synthesizer ISU 142d may synthesize the at least one piece of symbol image data Symbol and the second display data FDATA2 and generate the first display data FDATA1. This will be described in further detail with reference to FIGS. 11A through 11C.

Figure 11A:
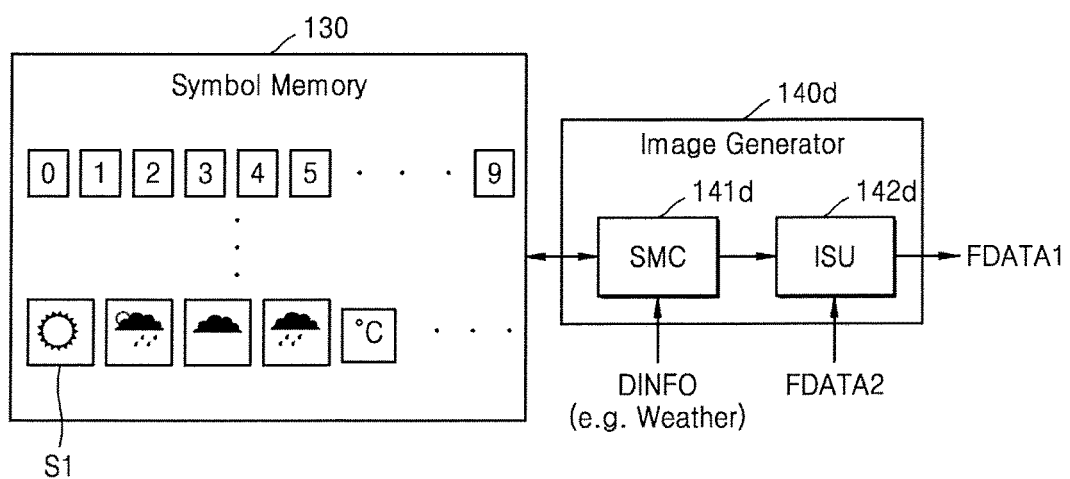
FIG. 11A illustrates an example of an operation of an image generator according to an exemplary embodiment of the inventive concept.
Figure 11B:
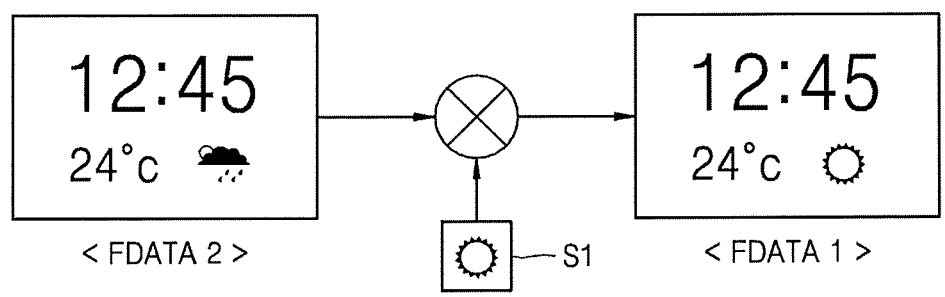
FIG. 11B illustrates an example of display data generated according to the operation of the image generator of FIG. 11A according to an exemplary embodiment of the inventive concept.
Figure 11C:
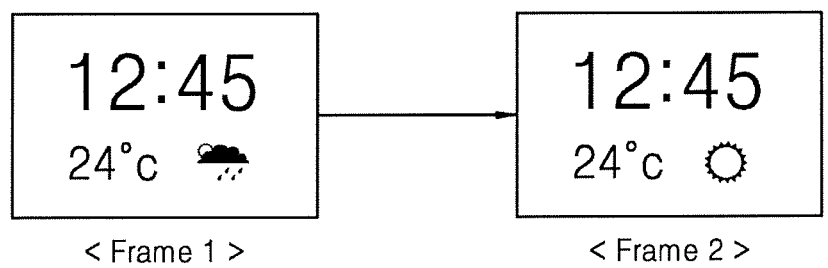
FIG. 11C illustrates an image corresponding to the display data of FIG. 11B displayed on a display panel according to an exemplary embodiment of the inventive concept.

FIG. 11A illustrates an example of an operation of the image generator 140d according to an exemplary embodiment of the inventive concept. FIG. 11B illustrates an example of the first display data FDATA1 generated according to the operation of the image generator 140d of FIG. 11A according to an exemplary embodiment of the inventive concept. FIG. 11C illustrates an image corresponding to the first display data FDATA1 of FIG. 11B displayed on a display panel according to an exemplary embodiment of the inventive concept.

An example in which the display panel 30 displays an image Frame 2 in which weather data is changed while displaying an image Frame 1 corresponding to the second display data FDATA2 indicating time, temperature, and weather will be described.

Referring to FIG. 11A, weather information may be provided to the image generator 140d as the display information DINFO. The memory controller SMC 141d may determine symbol image data indicating weather based on the weather information. The memory controller SMC 141d may access the first memory 130 and read the symbol image data indicating weather. For example, when the weather information indicates "sunny," the memory controller SMC 141d may read first symbol image data S1 corresponding to an image "sunny." The image synthesizer ISU 142d may synthesize the second display data FDATA2 and the first symbol image data, S1 and may generate the first display data FDATA1, as shown in FIG. 11B.

Referring to FIG. 11C, the display panel 30 may display the image Frame 2 in which weather is changed after displaying the image Frame 1.

Figure 12:
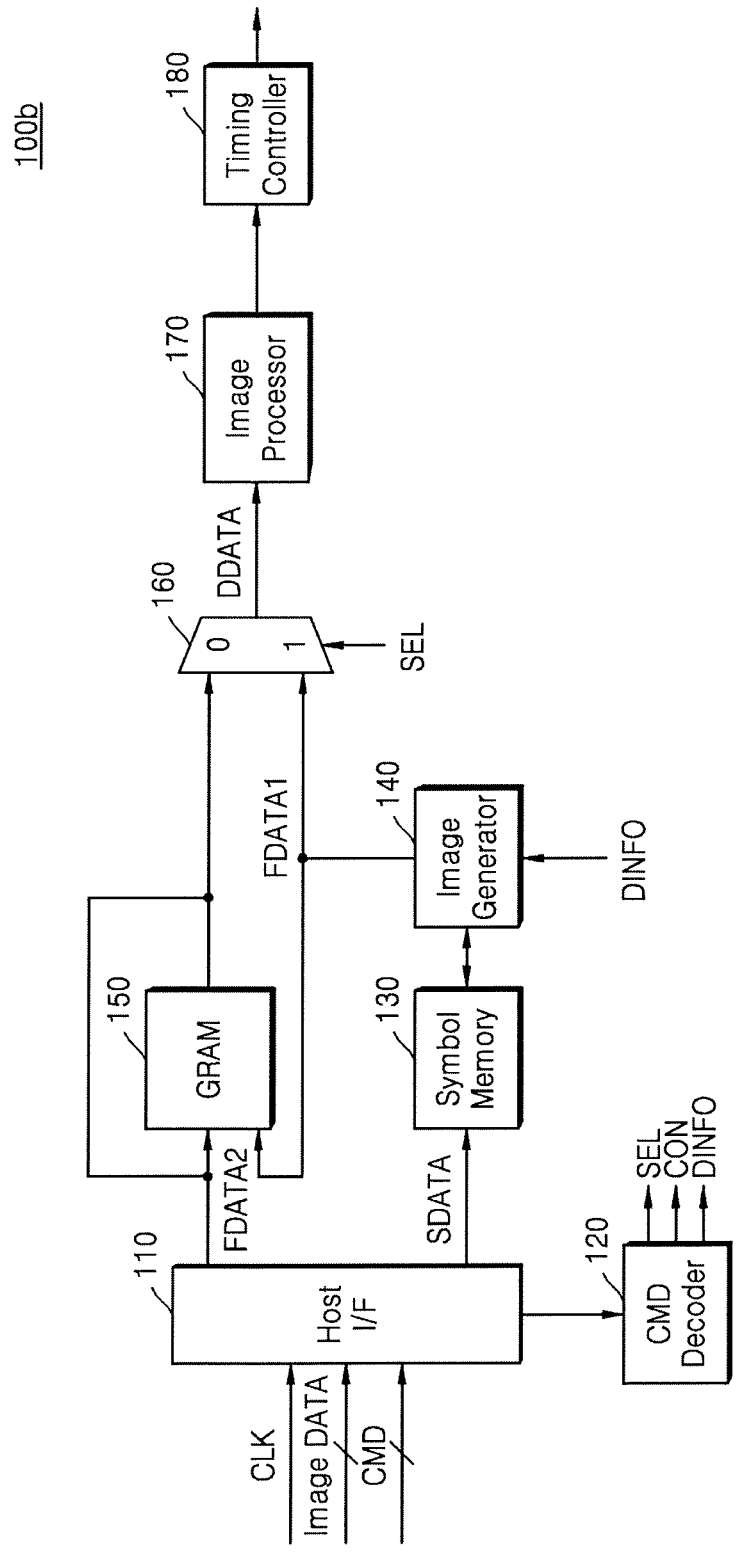
FIG. 12 is a block diagram of a display driver according to an exemplary embodiment of the inventive concept.

FIG. 12 is a block diagram of a display driver 100b according to an exemplary embodiment of the inventive concept. The display driver 100b of FIG. 12 is a modified version of the display driver 100 of FIG. 4. Thus, for convenience of explanation, a redundant description of elements and processes previously described may be omitted herein.

Referring to FIG. 12, the first display data FDATA1 generated by the image generator 140 may be transmitted to the selector 160 and the second memory 150. The display panel 30 may display an image at a preset frame rate. For example, when the display panel 30 displays the image at 60 frame per second (FPS), the image of 60 frames per second is displayed on the display panel 30. Thus, the same image may be continuously displayed until the image is changed. That is, the same image may be displayed on the display panel 30 during a plurality of frame sections.

Accordingly, there is a case in which an image corresponding to the first display data FDATA1 generated by the image generator 140 is displayed on the display panel 30 during the plurality of frame sections. Thus, the first display data FDATA1 may be stored in the second memory 150 and output from the second memory 150 during the plurality of frame sections.

According to an exemplary embodiment, the selector 160 may be omitted. In a first driving mode, the first display data FDATA1 generated by the image generator 140 may be stored in the second memory 150 and then output to the image processor 170 as the display data DDATA. In a second driving mode, the second display data FDATA2 received from the host processor 10 may be stored in the second memory 150 and then output to the image processor 170 as the display data DDATA, or the second memory 150 may be bypassed and the second display data FDATA2 may be directly transmitted to the image processor 170.

Figure 13:
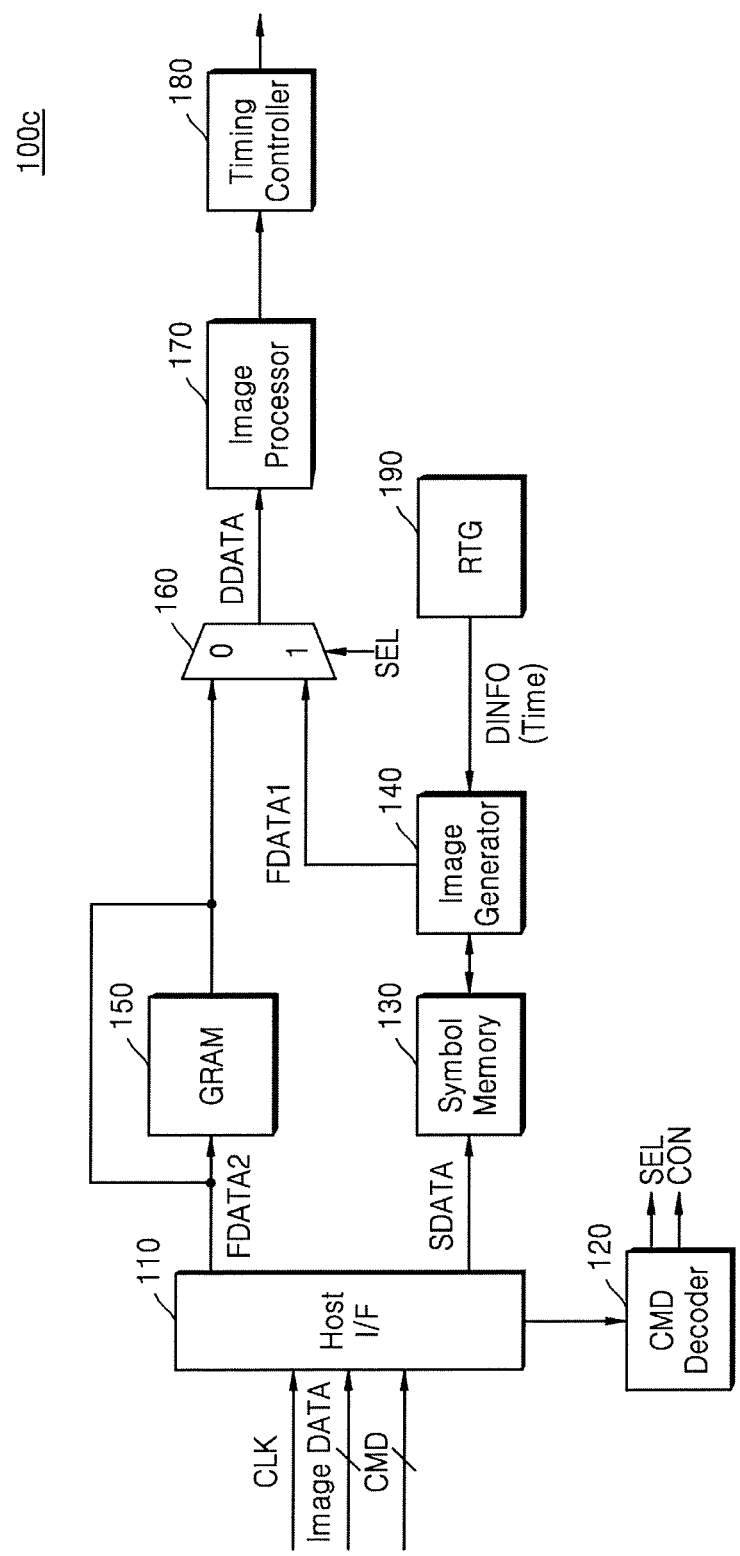
FIG. 13 is a block diagram of a display driver according to an exemplary embodiment of the inventive concept.

FIG. 13 is a block diagram of a display driver 100c according to an exemplary embodiment of the inventive concept. The display driver 100c is a modified version of the display driver 100 of FIG. 4. Thus, for convenience of explanation, a redundant description of elements and processes previously described may be omitted herein.

Referring to FIG. 13, the display driver 100c may include the host interface 110, the command decoder 120, the first memory 130, the image generator 140, a real time generator RTG 190, and a timing controller 180. According to an exemplary embodiment, the display driver 100c may further include the second memory 150, the selector 160, and/or the image processor 170.

In comparison to the display driver 100 of FIG. 4, the display driver 100c of FIG. 13 may further include the real time generator RTG 190.

The real time generator RTG 190 may generate time information and provide the time information to the image generator 140 as the display information DINFO. The real time generator RTG 190 may divide a clock signal output by an oscillator and may generate the time information.

The image generator 140 may generate the first display data FDATA1 indicating a time image using symbol image data indicating a time. In this regard, the image generator 140 may be provided with the time information (e.g., the display information DINFO) from the real time generator RTG 190 instead of the host processor 10.

Figure 14A:
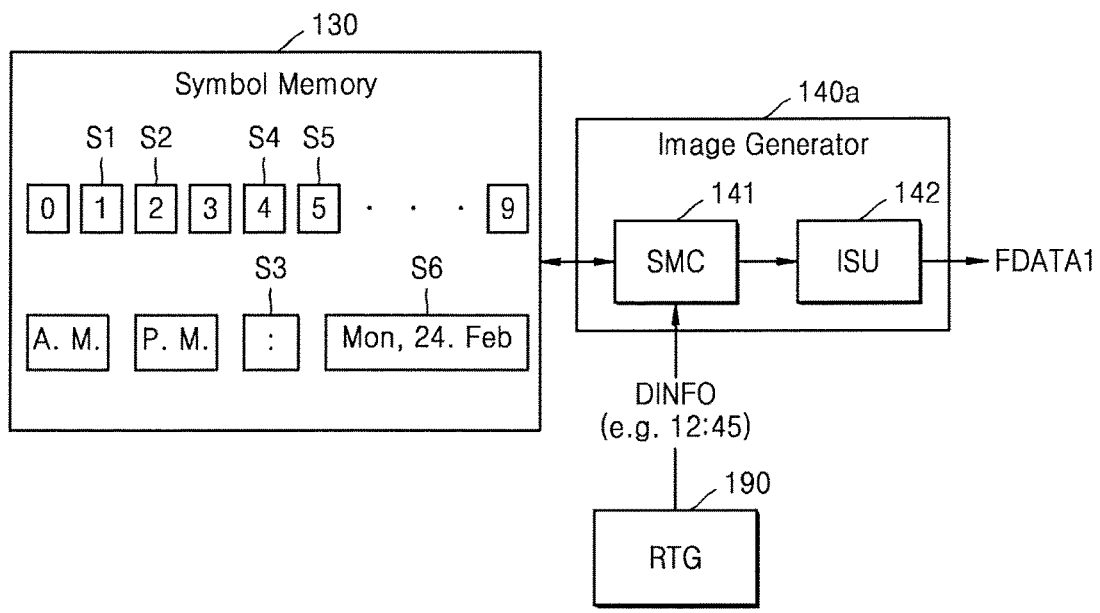
FIG. 14A is a diagram illustrating an example of an operation of an image generator according to an exemplary embodiment of the inventive concept.
Figure 14B:
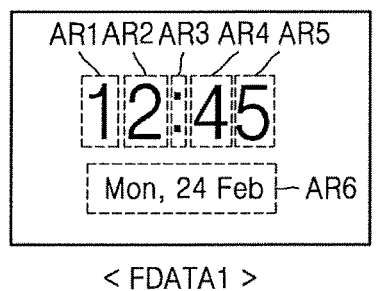
FIG. 14B illustrates an example of display data generated by the operation of the image generator of FIG. 14A according to an exemplary embodiment of the inventive concept.

FIG. 14A is a diagram illustrating an example of an operation of the image generator 140a according to an exemplary embodiment of the inventive concept. FIG. 14B illustrates an example of the display data FDATA1 generated by the operation of the image generator of FIG. 14A according to an exemplary embodiment of the inventive concept.

The real time generator RTG 190 may generate and provide time information to the image generator 140a as the display information DINFO. For example, when the time information indicates a time 12:45, the memory controller SMC 141 may read symbol image data S1, S2, S3, S4, and S5 indicating the time from the first memory 130. In addition, symbol image data S6 indicating a date may also be read.

The image synthesizer ISU 142 may synthesize the read symbol image data S1~S6 and may generate the first display data FDATA1. For example, as shown in FIG. 14B, the image synthesizer ISU 142 may include coordinate information with respect to regions AR1~AR6 of a watch image and may synthesize the read symbol image data S1~S6 with the regions AR1~AR6 based on the coordinate information.

Thereafter, every time the time information provided from the real time generator RTG 190 is renewed, the image generator 140a may synthesize symbol image data corresponding to the renewed time information and generate the new first display data FDATA1.

As another example, every time the time information provided from the real time generator RTG 190 is renewed, the image generator 140a may read at least one piece of symbol image data corresponding to a value different from previous time information from the renewed time information, synthesize the read symbol image data and the previously generated first display data FDATA1, and generate the current first display data FDATA1. For example, when the time information is renewed from 12:45 to 12:46, the image generator 140a may read symbol image data corresponding to a changed value (e.g., symbol image data indicating "6"), synthesize the symbol image data and the previous first display data FDATA1 indicating 12:45, and generate the new first display data FDATA1.

Figure 15A:
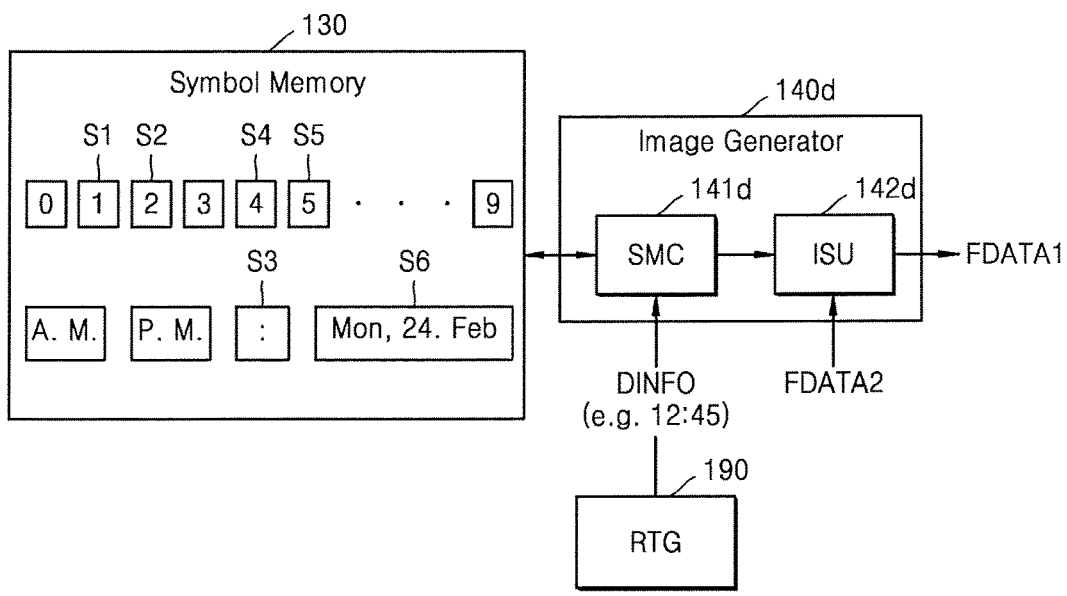
FIG. 15A is a diagram illustrating an example of an operation of an image generator according to an exemplary embodiment of the inventive concept.
Figure 15B:
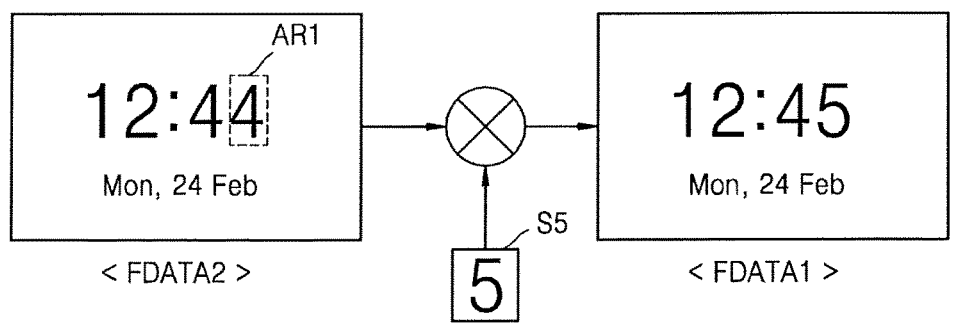
FIG. 15B illustrates an example of display data generated by the operation of the image generator of FIG. 15A according to an exemplary embodiment of the inventive concept.

FIG. 15A is a diagram illustrating an example of an operation of the image generator 140d according to an exemplary embodiment of the inventive concept. FIG. 15B illustrates an example of the display data FDATA1 generated by the operation of the image generator of FIG. 15A according to an exemplary embodiment of the inventive concept.

The image generator 140d according to the present exemplary embodiment may generate the first display data FDATA1 based on the display information DINFO received from the real time generator RTG 190 (e.g., time information), and the second display data FDATA2 received from the host processor 10. When an operation mode of the display driver 100c is changed from a second operation mode to a first operation mode, the display driver 100c may generate the first display data FDATA1 by synthesizing the second display data FDATA2 that is lastly received from the host processor 10 in the second operation mode and symbol image data read from the first memory 130 based on the display information DINFO.

Referring to FIGS. 15A and 15B, the display driver 100c may lastly receive the second display data FDATA2 corresponding to a watch image indicating 12:44 from the host processor 10 in the second operation mode, and may drive the display panel 30. Thereafter, the operation mode of the display driver 100c may be changed to the first operation mode and the display information DINFO indicating 12:45 may be received from the real time generator RTG 190. The image generator 140d may read the symbol image data S5 corresponding to a changed value "5." The image synthesizer ISU 142d may synthesize the first region AR1 of the second display data FDATA2 indicating 12:44 and the symbol image data S5, and may generate the first display data FDATA1 indicating 12:45.

Figure 16:
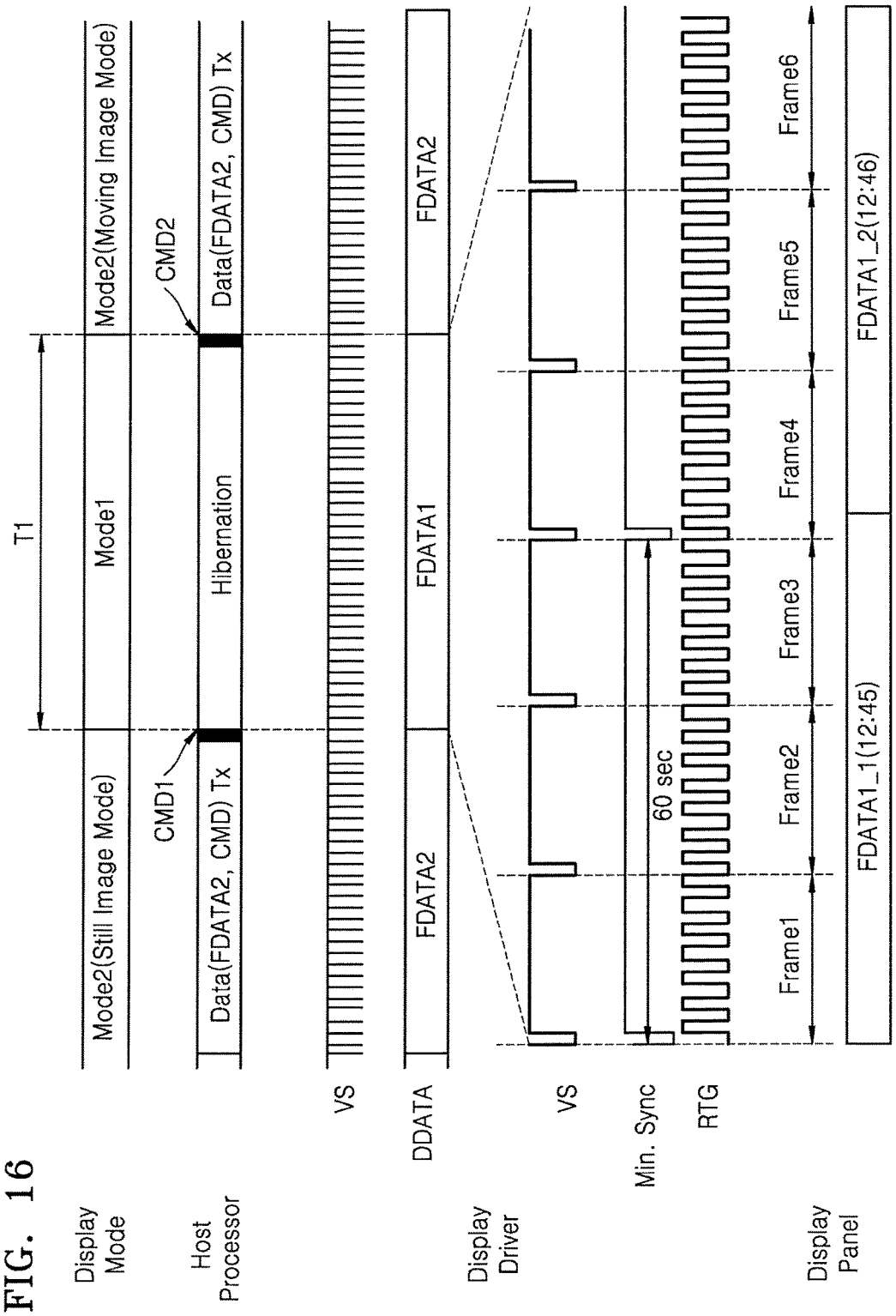
FIG. 16 is a timing diagram illustrating an operation of a display driver of FIG. 13 according to an exemplary embodiment of the inventive concept.

FIG. 16 is a timing diagram illustrating an operation of the display driver 100c of FIG. 13 according to an exemplary embodiment of the inventive concept.

Referring to FIG. 16, the display driver 100c may receive the first command signal CMD1 from a host processor (e.g., the host processor 10 of FIG. 1) while operating in a second operation mode, and then may operate in a first operation mode. In the first operation mode, the display driver 100c may output internally generated display data (e.g., the first display data FDATA1) as the display data DDATA. In the section T1 in which the display driver 100c operates in the first operation mode, the real time generator RTG (e.g., the real time generator RTG 190 of FIG. 13) may count clocks and generate time information every 60 seconds. The real time generator RTG 190 may provide the time information to the image generator 140 as display information.

In the section T1, the display driver 100c generates the display data DDATA based on the display information DINFO generated by the real time generator RTG 190 included therein, and thus, the host processor 10 may not transmit data to the display driver 100c. The host processor 10 may maintain a hibernation status or a sleep status in the section T1.

The image generator 140 generates the first display data FDATA1 based on the time information provided from the real time generator RTG 190 so that the image generator 140 may generate the new first display data FDATA1 every 60 seconds. The display driver 100c may generate the first display data FDATA1_1 indicating 12:45. The display panel 30 may display an image (e.g., 12:45) corresponding to the first display data FDATA1_1 for 60 seconds, for example, during the first through third frame sections Frame1~Frame3. Thereafter, after 60 seconds have elapsed, the display driver 100c may generate the first display data FDATA1_2 indicating time 12:46. The display panel 30 may display an image (e.g., 12:46) corresponding to the first display data FDATA1_2 for a new 60 seconds, for example, during the fourth through sixth frame sections Frame4~Frame6.

Figure 17:
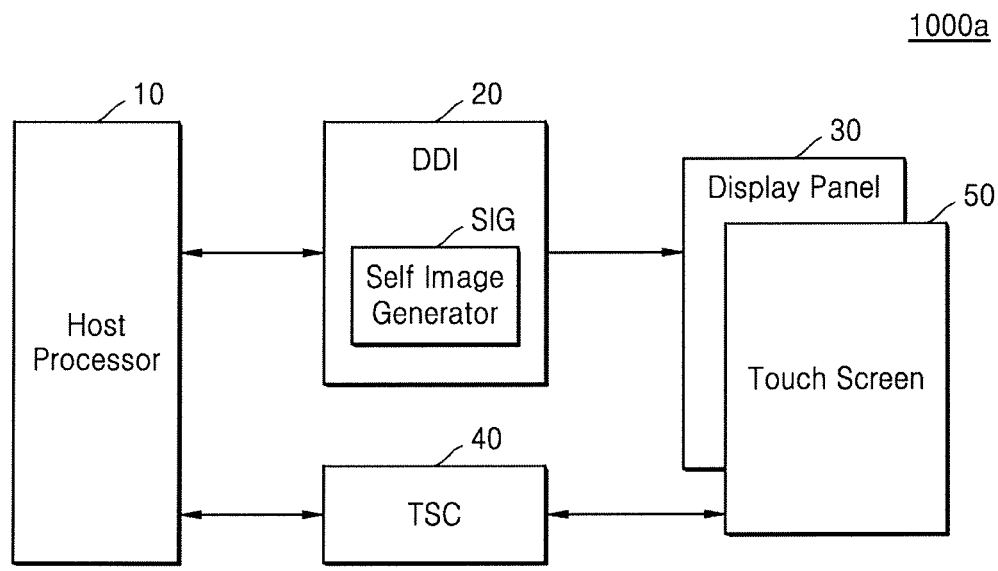
FIG. 17 is a block diagram of a display system according to an exemplary embodiment of the inventive concept.

FIG. 17 is a block diagram of a display system 1000a according to an exemplary embodiment of the inventive concept.

Referring to FIG. 17, the display system 1000a may include the host processor 10, the display driver 20, the display panel 30, a touch screen controller 40, and a touch screen 50. According to exemplary embodiments, the display driver 20 and the touch screen controller 40 may be implemented as separate chips or as a single chip. According to an exemplary embodiment, the host processor 10, the display driver 20, and the touch screen controller 40 may be implemented as a single module or as a single system-on-chip (SoC).

Operations of the host processor 10, the display driver 20, and the display panel 30 are similar to those of the corresponding elements of the display system 1000 of FIG. 1. Thus, for convenience of explanation, a redundant description thereof may be omitted herein.

The touch screen 50 may be implemented according to various touch detection methods such as, for example, a resistive film method, a light method, a capacitive method, an inductive method, an infrared (IR) method, a surface acoustic wave (SAW) method, etc. The touch screen 50 may be formed by overlapping the display panel 30, or by coupling with the display panel 30.

The touch screen controller 40 may detect a touch on the touch screen 50 and may generate a touch signal indicating whether a touch has been detected, a touch coordinate, a touch continuation time, etc. The touch screen controller 40 may provide the touch signal to the host processor 10.

The host processor 10 may provide display data corresponding to a changed image to the display driver 20 according to the touch signal received from the touch screen controller 40. The host processor 10 may provide the display information DINFO corresponding to the changed image according to the touch signal to the display driver 20 when the display driver 20 operates in a first operation mode.

Figure 18:
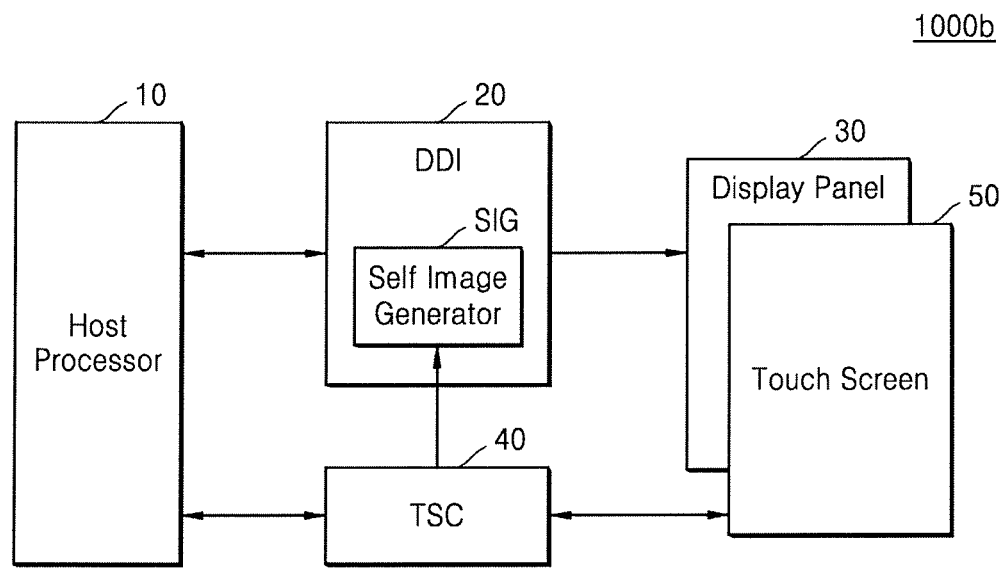
FIG. 18 is a block diagram of a display system according to an exemplary embodiment of the inventive concept.

FIG. 18 is a block diagram of a display system 1000b according to an exemplary embodiment of the inventive concept. The display system 1000b of FIG. 18 is a modified version of the display system 1000a of FIG. 17. Thus, for convenience of explanation, a redundant description of elements and processes previously described may be omitted herein.

In the display system 1000b of FIG. 18, the touch screen controller 40 may directly provide a touch signal to the display driver 20. The self image generator SIG of the display driver 20 may generate display data based on the touch signal. The display driver 20 may generate the display data corresponding to the touch signal without an operation of the host processor 10, thereby reducing a load of the host processor 10 and providing a user interface (UI) having a fast response characteristic.

Figure 19:
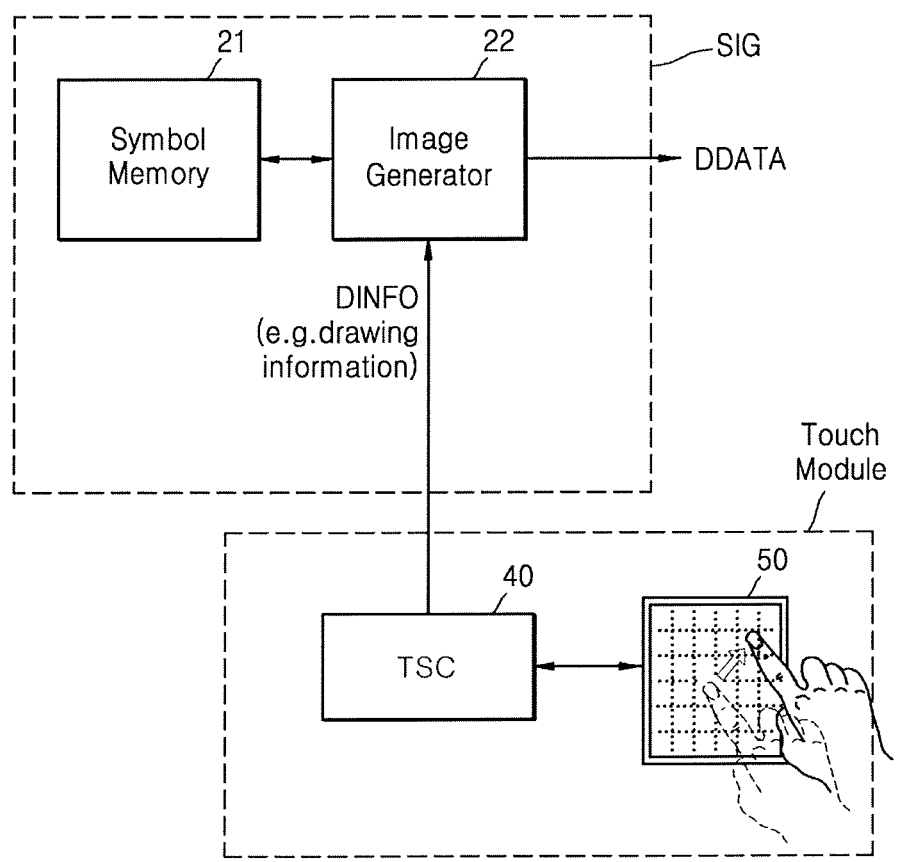
FIG. 19 is a block diagram of an example of a display driver and a touch screen controller of FIG. 18 according to an exemplary embodiment of the inventive concept.

FIG. 19 is a block diagram of an example of the display driver 20 and the touch screen controller 40 of FIG. 18 according to an exemplary embodiment of the inventive concept.

Referring to FIG. 19, if a user touch occurs on the touch screen 50, the touch screen controller 40 may provide a touch signal corresponding to the touch to the image generator 22 of the display driver 20 as the display information DINFO. For example, the touch screen controller 40 may provide drawing information according to the user touch. The image generator 22 may access the first memory 21 based on touch data, for example, the drawing information, read symbol image data or frame image data, and generate the display data DDATA using the symbol image data or the frame image data.

Figure 20:
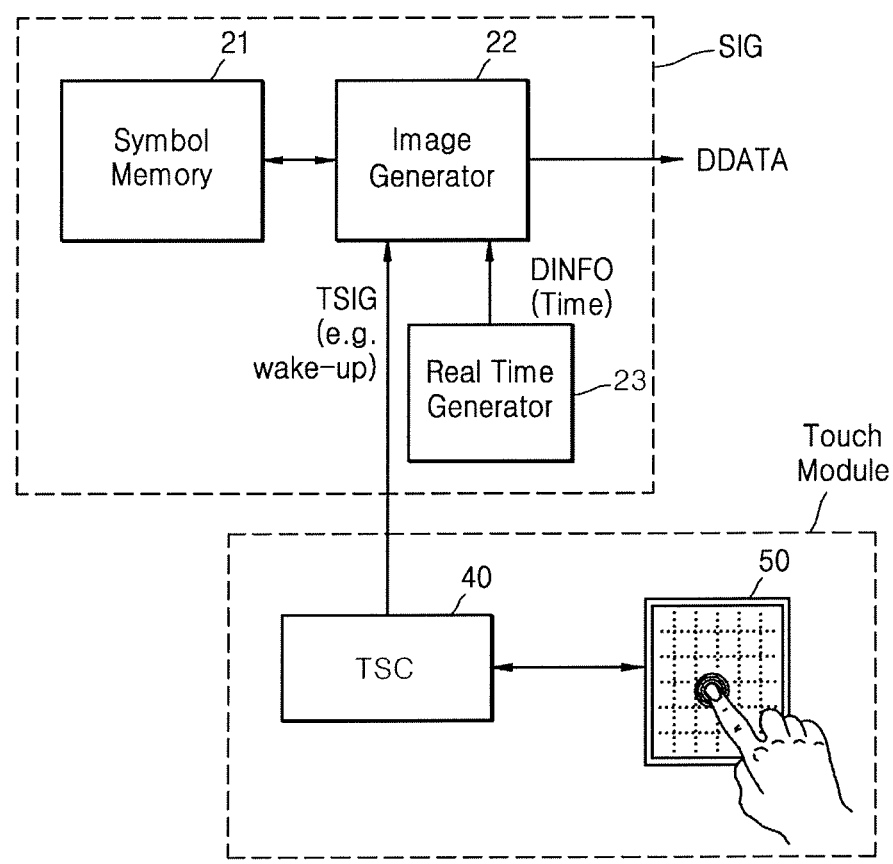
FIG. 20 is a block diagram of an example of a display driver and a touch screen controller of FIG. 18 according to an exemplary embodiment of the inventive concept.

FIG. 20 is a block diagram of an example of the display driver 20 and the touch screen controller 40 of FIG. 18 according to an exemplary embodiment of the inventive concept.

Referring to FIG. 20, the self image generator SIG may include the first memory 21, the image generator 22, and a real time generator 23. The real time generator 23 may provide time information to the image generator 22 as the display information DINFO. The image generator 22 may generate the display data DDATA corresponding to a time image based on the display information DINFO. If a user touch occurs on the touch screen 50, the touch screen controller 40 may provide a touch signal TSIG indicating that the touch has occurred to the image generator 22 of the display driver 20.

If the image generator 22 receives the touch signal TSIG, the image generator 22 may generate the display data DDATA during a predetermined period of time. The image generator 22 may update the display data DDATA based on time information provided from the real time generator 23 (e.g., based on the display information DINFO).

For example, if the display driver 20 does not operate and receives the touch signal TSIG, the display driver 20 may recognize the touch signal TSIG as a wakeup signal, generate the display data DDATA indicating the predetermined period of time, and drive the display panel 30 based on the display data DDATA. Accordingly, the display panel 30 may display a time image if the user touch occurs on the touch screen 50 while no image is displayed.

Figure 21:
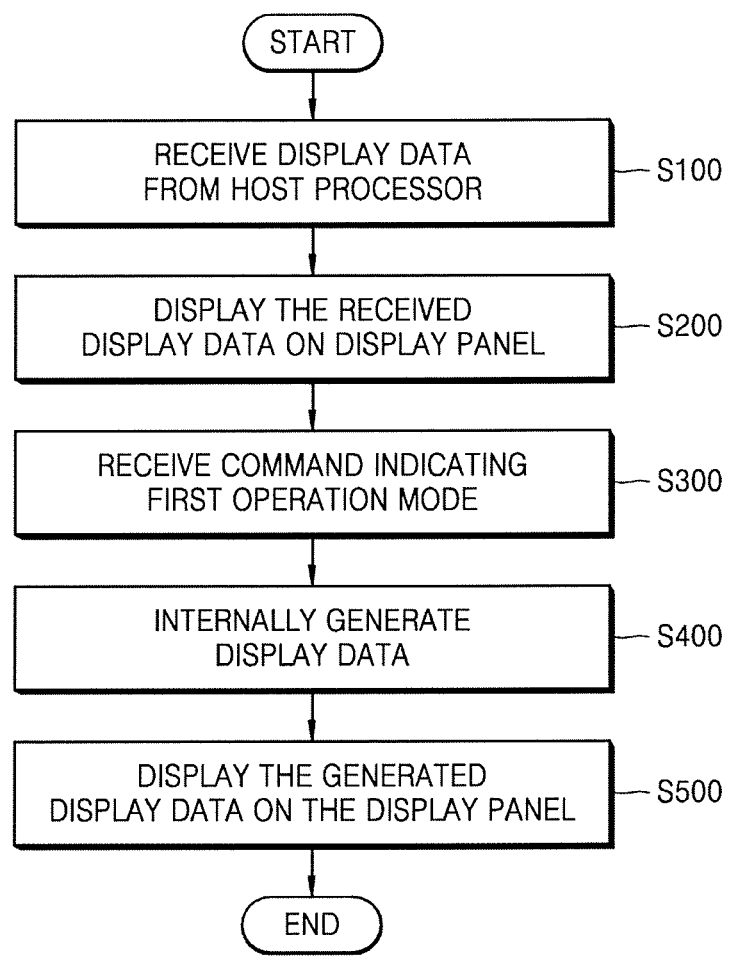
FIG. 21 is a flowchart of a method of operating a display driver according to an exemplary embodiment of the inventive concept.

FIG. 21 is a flowchart of a method of operating a display driver according to an exemplary embodiment of the inventive concept.

Referring to FIG. 21, a display driver receives display data from a host processor (operation S100). The display driver may receive a command signal or a clock signal along with the display data. As an example, the display data received from the host processor may be stored in a memory (e.g., a graphic memory or a frame memory) included in the display driver.

The display driver displays the received display data on a display panel (operation S200). In this regard, displaying the display data on the display panel refers to the display driver driving the display panel based on the display data. Thus, the display panel displays an image corresponding to the display data.

Thereafter, the display driver receives the command signal indicating a first operation mode from the host processor (operation S300). The first operation mode is an operation mode in which the display driver drives the display panel based on internally generated display data other than the display data received from the host processor. For example, when a typical image such as, for example, a watch image, an incoming phone call image, etc., or an expectable image is displayed on the display panel, the host processor may generate the command signal that causes the display driver to generate the display data for itself and transmit the command signal to the display driver. As described above, the command signal may be received along with the display data. As an example, the command signal and the display data may be received as packet data.

The display driver internally generates display data (operation S400). The display driver may generate the display data using image data that is previously stored in an internal memory, for example, a symbol memory. In this regard, the symbol memory may be identified from the frame memory that stores the display data received from the host processor. The symbol memory and the frame memory may be physically identified. Alternatively, the symbol memory and the frame memory may be different storage regions of a single memory device.

The display driver may display the generated display data on the display panel (operation S500).

Figure 22:
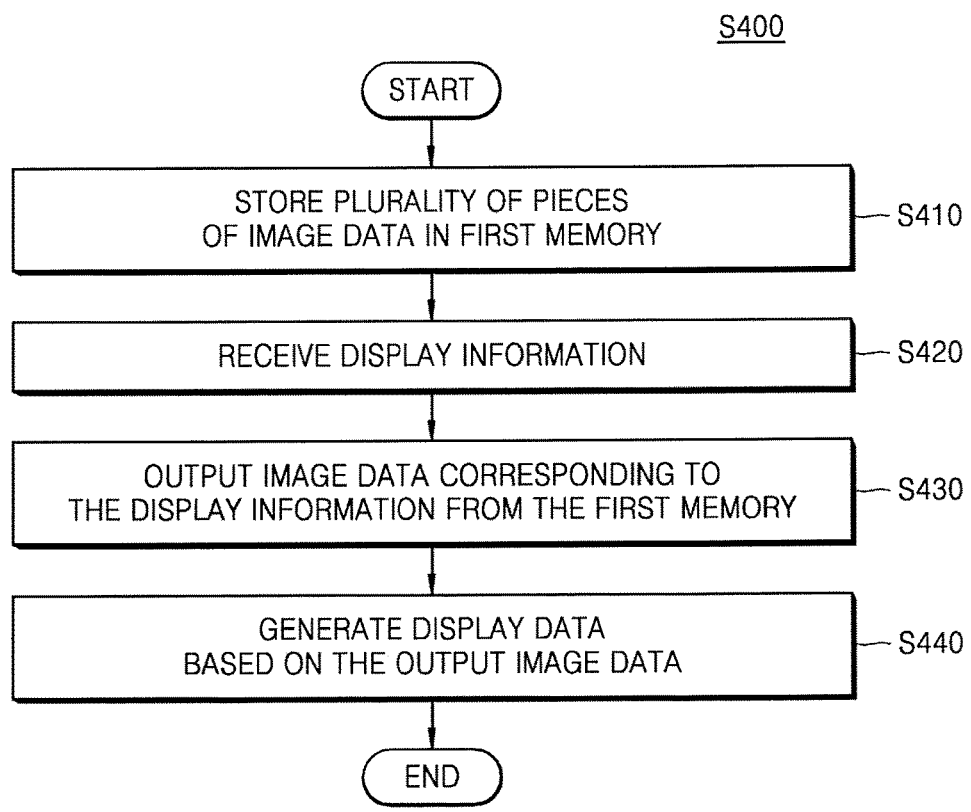
FIG. 22 is a flowchart of a method of generating display data performed by a display driver according to an exemplary embodiment of the inventive concept.

FIG. 22 is a flowchart of a method of generating display data performed by a display driver according to an exemplary embodiment of the inventive concept.

Referring to FIG. 22, the display driver may store a plurality of pieces of image data in a first memory (operation S410). The first memory may be the symbol memory described with reference to FIG. 21. The image data may be image data in a frame unit corresponding to a symbol image such as, for example, characters, numbers, symbols, etc. constituting an image or an image that is expected to be subsequently displayed on a display panel. The plurality of pieces of image data may be provided by a host processor.

Next, the display driver may receive display information (operation S420). The display information may be received from the host processor. As another example, the display information may be internally generated by the display driver. For example, the display driver may include a real time generator. The real time generator generates time information. The display driver may use time information as the display information.

The display driver outputs image data corresponding to the display information from the first memory (operation S430). The image data necessary for generating the display data may be wholly or partially output. For example, when a watch image is to be displayed, symbol image data corresponding to numbers and characters necessary for indicating a time may be wholly or partially read.

The display driver may generate the display data based on the output image data (operation S440). The display driver may synthesize the output image data and generate the display data. Alternatively, the display driver may synthesize a part of previous display data corresponding to an image displayed on the display panel and the read image data, and may generate the display data.

Figure 23:
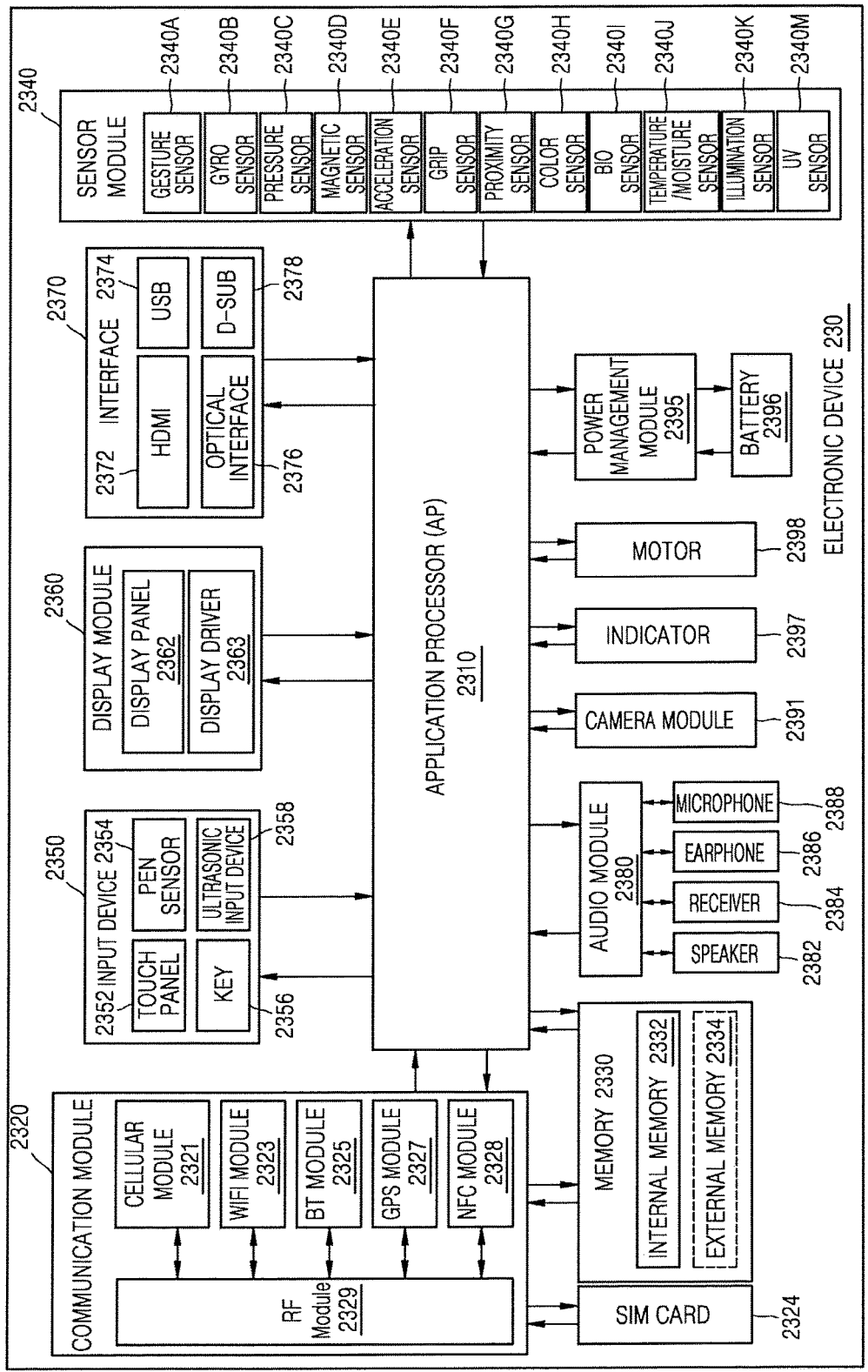
FIG. 23 is a block diagram of an electronic device including a display system according to an exemplary embodiment of the inventive concept.

FIG. 23 is a block diagram of an electronic device 230 according to an exemplary embodiment of the inventive concept. The electronic device 230 may include, for example, the display system 1000 of FIG. 1. Referring to FIG. 23, the electronic device 230 may include at least one of an application processor (AP) 2310, a communication module 2320, a subscriber identification module (SIM) card 2324, a memory 2330, a sensor module 2340, an input device 2350, a display module 2360, an interface 2370, an audio module 2380, a camera module 2391, a power management module 2395, a battery 2396, an indicator 2397, and a motor 2398.

The AP 2310 may drive an operating system (OS) or an application program, control a plurality of hardware or software elements connected to the AP 2310, and perform processing and operations on various types of data including multimedia data. The AP 2310 may be implemented as, for example, an SoC. According to an exemplary embodiment, the AP 2310 may further include a graphic processing unit.

The communication module 2320 may perform data transmission and reception through communication between different electronic devices connected to the electronic device 230 over a network. According to an exemplary embodiment, the communication module 2320 may include at least one of a cellular module 2321, a WiFi module 2323, a BLUETOOTH module 2325, a GPS module 2327, a near field communication (NFC) module 2328, and a radio frequency (RF) module 2329.

The cellular module 2321 may allow a voice call, a video call, a text service, an Internet service, etc. to be performed through a communication network (e.g., a communication network such as an LTE, LTE-A, CDMA, WCDMA, UMTS, WiBro, or GSM network). The cellular module 2321 may identify and authenticate an electronic device in a communication network using, for example, a SIM (e.g. the SIM card 2324). According to an exemplary embodiment, the cellular module 2321 may perform at least a part of functions that may be provided by the AP 2310. For example, the cellular module 2321 may perform at least a part of multimedia control functions.

According to an exemplary embodiment, the cellular module 2321 may include a communication processor (CP). The cellular module 2321 may be implemented as, for example, an SoC. Although elements such as the cellular module 2321 (e.g., the CP), the memory 2330, and the power management module 2395 are illustrated as elements separate from the AP 2310 in FIG. 23, according to an exemplary embodiment, the AP 2310 may be implemented to include at least a part (e.g., the cellular module 2321) of the above-described elements.

According to an exemplary embodiment, the AP 2310 or the cellular module 2321 (e.g., the CP) may load and process a command or data received from a non-volatile memory connected thereto, or from a volatile memory. The AP 2310 or the cellular module 2321 may store data received or generated by at least one of other elements in the non-volatile memory.

Each of the WiFi module 2323, the BLUETOOTH module 2325, the GPS module 2327, and the NFC module 2328 may include, for example, a processor for processing data transmitted and received through a corresponding module. In an exemplary embodiment, at least two of the cellular module 2321, the WiFi module 2323, the BLUETOOTH module 2325, the GPS module 2327, and the NFC module 2328 may be included in a single integrated circuit (IC) or an IC package. For example, a CP corresponding to at least a part (e.g., the cellular module 2321 and a WiFi processor corresponding to the WiFi module 2323) of processors corresponding to the cellular module 2321, the WiFi module 2323, the BLUETOOTH module 2325, the GPS module 2327, and the NFC module 2328 may be implemented as a single SoC.

The RF module 2329 may transmit and receive data such as, for example, an RF signal. The RF module 2329 may include, for example, a transceiver, a power amplifier module (PAM), a frequency filter, and/or a low noise amplifier (LNA). The RF module 2329 may further include parts for transmitting and receiving an electromagnetic wave on a free space in a wireless communication such as, for example, a conductor or a conducting wire. Although the cellular module 2321, the WiFi module 2323, the BLUETOOTH module 2325, the GPS module 2327, and the NFC module 2328 share the single RF module 2329 in FIG. 23, according to an exemplary embodiment, at least one of the cellular module 2321, the WiFi module 2323, the BLUETOOTH module 2325, the GPS module 2327, and the NFC module 2328 may transmit and receive the RF signal through a separate RF module.

The SIM card 2324 may be a card including a SIM and may be inserted into a slot formed in a specific location of the electronic device 230. The SIM card 2324 may include unique identification information (e.g., an integrated circuit card identifier (ICCID) or subscriber information (e.g., an international mobile subscriber identity (IMSI))).

The memory 230 may include an internal memory 2332 and/or an external memory 2334. The internal memory 2332 may include at least one of, for example, a volatile memory (e.g., dynamic random access memory (DRAM), static RAM (SRAM), synchronous dynamic RAM (SDRAM), etc.) or a non-volatile memory (e.g., one time programmable ROM (OTPROM), phase-change RAM (PRAM), erasable and programmable ROM (EPROM), electrically erasable and programmable ROM (EEPROM), a mask ROM, flash ROM, NAND flash memory, NOR flash memory, etc.).

According to an exemplary embodiment, the internal memory 2332 may be a solid state drive (SSD). The external memory 2334 may further include a flash drive such as, for example, compact flash (CF), secure digital (SD), micro-secure digital (SD), mini-SD, extreme digital (xD), or a memory stick. The external memory 2334 may be functionally connected to the electronic device 230 via various interfaces. According to an exemplary embodiment, the electronic device 230 may further include a storage device (e.g., a storage medium) such as, for example, a hard disk drive.

The sensor module 2340 may measure a physical occurrence or sense an operating status of the electronic device 230 and convert measured or sensed information into an electrical signal. The sensor module 2340 may include at least one of, for example, a gesture sensor 2340A, a gyro sensor 2340B, an air pressure sensor 2340C, a magnetic sensor 2340D, an acceleration sensor 2340E, a grip sensor 2340F, a proximity sensor 2340G, a color sensor 2340H (e.g., a red, green, and blue (RGB) sensor), a biometric sensor 2340I, a temperature/moisture sensor 2340J, an illumination sensor 2340K, and an ultra violet (UV) sensor 2340M. The sensor module 2340 may further include at least one of, for example, an E-nose sensor, an electromyography (EMG) sensor, an electroencephalogram (EEG) sensor, an electrocardiogram (ECG) sensor, an infrared (IR) sensor, an iris sensor, and a fingerprint sensor. The sensor module 2340 may further include a control circuit for controlling at least one sensor included therein.

The input device 2350 may include a touch panel 2352, a (digital) pen sensor 2354, a key 2356, and/or an ultrasonic input device 2358. The touch panel 2352 may recognize a touch input by using at least one of, for example, a capacitive method, a resistive method, an IR method, and an ultrasonic method. The touch panel 2352 may further include a control circuit. The capacitive method is capable of physical contact or proximity recognition. The touch panel 2352 may further include a tactile layer. In this case, the touch panel 2352 may provide a user with a tactile response.

The (digital) pen sensor 2354 may be implemented, for example, in the same or similar manner as receiving a user touch input or by using a separate recognition sheet. The key 2356 may include, for example, a physical button, an optical key, or a keypad. The ultrasonic input device 2358 is a device capable of sensing a sound wave by using a microphone (e.g., a microphone 2388) in the electronic device 230 and determining data through an input tool of generating an ultrasonic signal, and thus, wireless recognition is possible. According to an exemplary embodiment, the electronic device 230 may receive a user input from an external device (e.g., a computer or a server) connected to the communication module 2320 by using the communication module 2320.

The display module 2360 may include a display panel 2362 and a display driver 2363. The display panel 2362 may be, for example, a liquid crystal display (LCD) or an active matrix organic light emitting diode (AMOLED). The display panel 2362 may be implemented, for example, flexibly, transparently, or wearably. The display panel 2362 and the touch panel 2352 may be configured as a single module. The display panel 2362 may include a plurality of regions. Alternatively, the display panel 2362 and the touch panel 2352 may be separate, and a plurality of display panels 2362 may be included.

The display panel 2362 may be replaced with a hologram device or a projector. The hologram device may use interference of light to show a 3D image in the air. The projector may project light onto a screen and display an image. The screen may be located, for example, inside or outside of the electronic device 230.

The display driver 2363 may receive display data from the AP 2310 and may drive the display panel 2362 based on the received display data. According to an exemplary embodiment of the inventive concept, the display driver 2362 may generate display data for itself during a specific operation section and may drive the display panel 2362 based on the generated display data.

The interface 2370 may include at least one of, for example, a high definition multimedia interface (HDMI) 2372, a universal serial bus (USB) interface 2374, an optical interface 2376, or a D-subminiature (SUB) interface 2378. The interface 2370 may further include at least one of, for example, a mobile high definition link (MHL) interface, an SD card/multimedia card (MMC) interface or an infrared data association (IRDA) standard interface.

The audio module 2380 may bidirectionally change sound and an electrical signal. The audio module 2380 may process sound information that is input or output through, for example, a speaker 2382, a receiver 2384, an earphone 2386, or the microphone 2388.

The camera module 2391 is a device that captures a still image and a moving image (e.g., video). According to an exemplary embodiment, the camera module 2391 may include one or more image sensors (e.g., a front sensor or a rear sensor), a lens, an image signal processor (ISP), or a flash (e.g., an LED or a xenon lamp).

The power management module 2395 may manage power of the electronic device 230. The power management module 2395 may include, for example, a power management integrated circuit (PMIC), a charger integrated circuit (IC), or a battery or a fuel gauge.

The PMIC may be mounted in, for example, an IC or an SoC semiconductor. Charging methods may include both wired and wireless charging methods. The charger IC may charge the battery, and may prevent an excessive voltage or an excessive current from being provided from a charger. According to an exemplary embodiment, the charger IC may include a charging IC for at least one of a wired charging method and a wireless charging method. The wireless charging method may include, for example, a magnetic resonance method, a magnetic induction method, an electromagnetic wave method, etc. An additional circuit for wireless charging may include a circuit, for example, a coil loop, a resonance circuit, a rectifier, etc.

The battery gauge may measure, for example, a remaining battery charge of the battery 2396, a voltage being charged, a current, or a temperature. The battery 2396 may store or generate electricity, and may supply power to the electronic device 230 by using the stored or generated electricity. The battery 2396 may include, for example, a rechargeable battery or a solar battery.

The indicator 2397 may display a specific status of the electronic device 230 or a part thereof (e.g., the AP 2310) such as, for example, a booting status, a message status, a charging status, etc. The motor 2398 may convert the electrical signal into a mechanical vibration. The electronic device 230 may include a processing device (e.g., a CPU) for mobile TV support. The processing device for the mobile TV support may process media data according to a standard such as, for example, digital multimedia broadcasting (DMB), digital video broadcasting (DVB), media flow, etc.

Each of the above-described elements of electronic devices according to various exemplary embodiments of the inventive concept may include one or more components of which the title may vary according to types of the electronic devices. The electronic devices according to various exemplary embodiments of the inventive concept may include at least one of the above-described elements and may not include a part of the above-described elements, or may include an additional element(s). A single entity may be configured by combining some of the above-described elements of the electronic devices according to various exemplary embodiments of the inventive concept, and thus, functions of the corresponding elements before being combined may be performed in the same manner.

Figure 24:
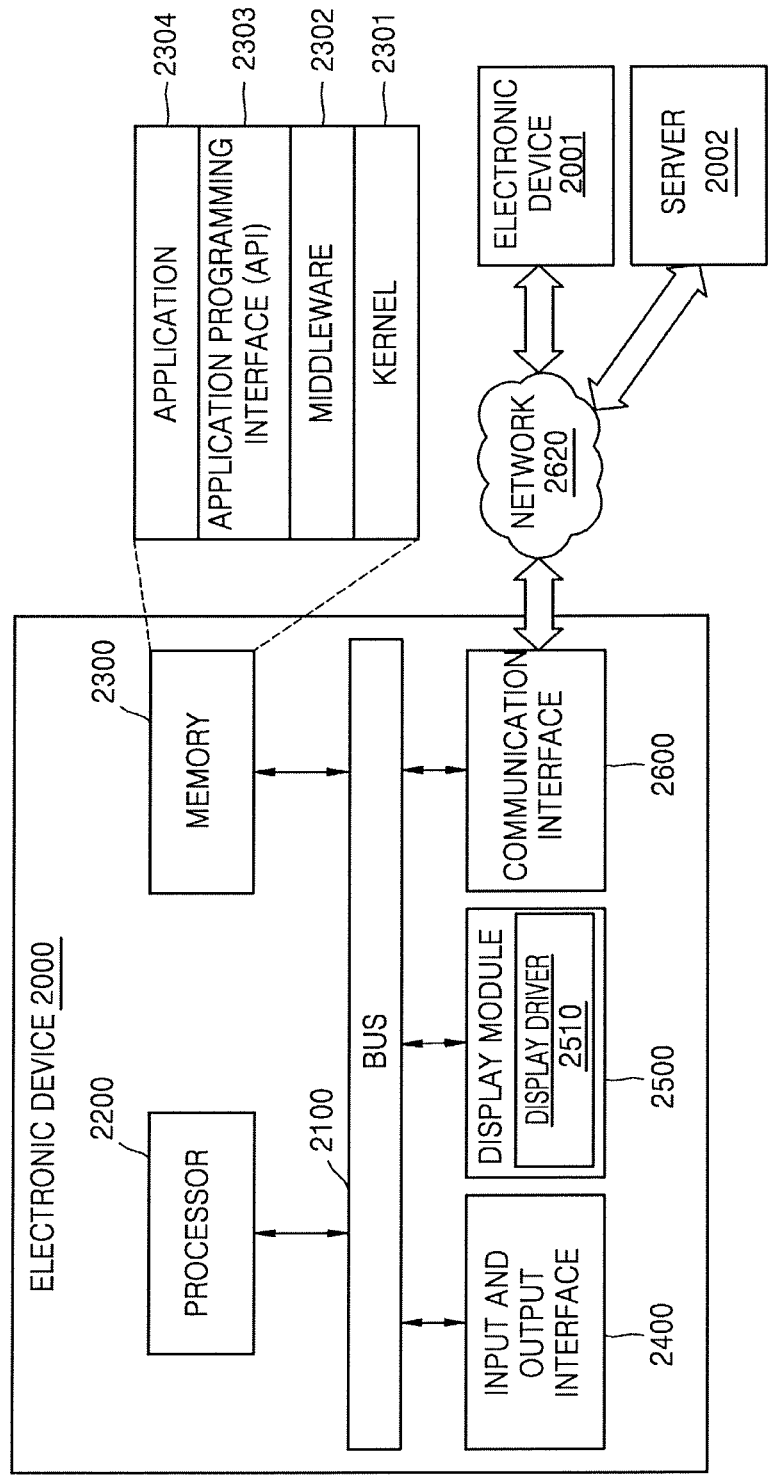
FIG. 24 is a block diagram of a network environment including an electronic device according to an exemplary embodiment of the inventive concept.

FIG. 24 is a block diagram of a network environment including an electronic device 2000 according to an exemplary embodiment of the inventive concept. Referring to FIG. 24, the electronic device 2000 may include a bus 2100, a processor 2200, a memory 2300, an input and output interface 2400, a display module 2500, and a communication interface 2600.

The bus 2100 may be a circuit that connects the above-described elements to each other and facilitates communication between the above-described elements (e.g., a control message may be communicated via the bus 2100).

The processor 2200 may receive a command from the above-described elements (e.g., from the memory 2300, the input and output interface 2400, the display module 2500, and the communication interface 2600) through the bus 2100, analyze the received command, and perform an operation or data processing according to the analyzed command.

The memory 2300 may store commands or data received from or generated by the processor 2200 or other elements (e.g., the input and output interface 2400, the display module 2500, and the communication interface 2600). The memory 2300 may include programming modules such as, for example, a kernel 2301, middleware 2302, an application programming interface (API) 2303, applications 2304, etc. The above-described programming modules may be configured as, for example, software, firmware, hardware, or a combination thereof.

The kernel 2301 may control or manage system resources (e.g., the bus 2100, the processor 2200, the memory 2300, etc.) used to perform operations or functions implemented by other programming modules such as, for example, the middleware 2302, the API 2303, and the applications 2304. The kernel 2301 may provide an interface through which the middleware 2302, the API 2303, or the applications 2304 accesses and controls or manages an individual element of the electronic device 2000.

The middleware 2302 may serve as an intermediary to allow the API 2303 or the applications 2304 to communicate with the kernel 2301 and transmit and receive data.

The middleware 2302 may control (e.g., schedule or balance a load) operation requests by using a method of assigning a priority to use a system resource (e.g., the bus 2100, the processor 2200, the memory 2300, etc.) of the electronic device 2000, for example, to at least one of the applications 2304 with respect to the operation requests received from the applications 2304.

The API 2303 is an interface used to allow the applications 2304 to control a function provided by the kernel 2301 or the middleware 2302, and may include at least one interface or function (e.g., a command language), for example, for file control, window control, image processing, or text control.

According to various exemplary embodiments, the applications 2304 may include, for example, an SMS/MMS application, an email application, a calendar application, an alarm application, a healthcare application (e.g., an application measuring an exercise amount or a blood glucose), or an environment information application (e.g., an application providing air pressure information, moisture information, or temperature information). The applications 2304 may further include an application relating to information exchange between the electronic device 2000 and an external electronic device (e.g., the electronic device 2001). The application relating to the information exchange may include, for example, a notification relay application for notifying specific information to the external electronic device, or a device management application for managing the external electronic device. For example, the notification relay application may include a function of relaying notification information generated in another application (e.g., the SMS/MMS application, the email application, the healthcare application, or the environment information application) to the external electronic device (e.g., the electronic device 2001). Further, the notification relay application may receive notification information from, for example, the external electronic device (e.g., the electronic device 2001) and may provide the notification information to a user. The device management application may manage (e.g., install, delete, or update), for example, a function of turning on/off the external electronic device itself (or a partial component thereof), or adjusting the brightness or resolution of the display of at least a part of the external electronic device (e.g., the electronic device 2001) and a service (e.g., a phone call service or a message service) provided by an application operating in the external electronic device or provided by the external electronic device.

According to various exemplary embodiments, the applications 2304 may include an application designated according to an attribute (e.g., a type of an electronic device) of the external electronic device (e.g., the electronic device 2001). For example, when the external electronic device is an MP3 player, the applications 2304 may include an application relating to music play. Similarly, when the external electronic device is a mobile medical device, the applications 2304 may include an application relating to healthcare. According to an exemplary embodiment, the applications 2304 may include at least one of an application designated by the electronic device 2000 and an application received from the external electronic device (e.g., the server 2002 or the electronic device 2001).

The input and output interface 2400 may transfer a command or data input by a user through an input and output device (e.g., a sensor, a keyboard, or a touch screen) to, for example, the processor 2200, the memory 2300, or the communication interface 2600. For example, the input and output interface 2400 may provide data regarding a user touch input through a touch screen to the processor 2200. The input and output interface 2400 may output a command or data received from the processor 2200, the memory 2300, or the communication interface 2600, for example, through the bus 2100, through the input and output device (e.g., a speaker or a display). For example, the input and output interface 2400 may output sound data processed by the processor 2200 to the user through the speaker.

The display module 2500 may display various types of information (e.g., multimedia data or text data) to the user. The display module 2500 may include a display (e.g., a display panel, a projector, a hologram device, etc.) and a display driver 2510. The display driver 2510 may receive display data corresponding to an image that is to be displayed, drive the display panel based on the display data, and display the image on the display panel. For example, the display driver 2510 may be one of the display drivers described with reference to FIGS. 1 through 22. The display driver 2510 may generate display data for itself during a specific section and may drive the display panel based on the display data.

The communication interface 2600 may act as a communication interface between the electronic device 2000 and an external device (e.g., the electronic device 2001 or the server 2002). For example, the communication interface 2600 may be connected to a network 2620 through wireless communication or wired communication and may communicate with the external device. The wireless communication may include at least one of, for example, WiFi, BLUETOOTH, near field communication (NFC), global positioning system (GPS), and cellular communication (e.g., LTE, LTE-A, CDMA, WCDMA, UMTS, WiBro, GSM, etc.). The wired communication may include at least one of, for example, USB, HDMI, recommended standard 232 (RS-232), and a plain old telephone service (POTS).

According to an exemplary embodiment, the network 2620 may be a telecommunication network. The telecommunication network may include at least one of a computer network, Internet, Internet of things (IoT), and a telephone network. According to an exemplary embodiment, a protocol (e.g., a transport layer protocol, a data link layer protocol, or a physical layer protocol) for communication between the electronic device 2000 and the external device may be supported by at least one of the applications 2304, the API 2303, the middleware 2302, the kernel 2301, and the communication interface 2600.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A display driver, comprising:
an interface configured to receive a plurality of pieces of reference image data and a command signal indicating an operation mode of the display driver from a host processor distinct from the display driver;
a first memory configured to store the plurality of pieces of reference image data;
a second memory configured to store second display data provided from the host processor; and
an image generator configured to access the first memory based on display information, and generate first display data based on at least one piece of reference image data corresponding to the display information from among the plurality of pieces of reference image data stored in the first memory, in response to a first operation mode of the command signal,
wherein, in the first operation mode, the interface does not receive any display data from the host processor, and the image generator internally generates the first display data based on the at least one piece of reference image data stored in the first memory,
wherein the at least one piece of reference image data used to internally generate the first display data in the first operation mode is received by the display driver before a display section,
wherein, in a second operation mode, the interface receives the second display data from the host processor,
wherein the second operation mode, when the second display data corresponds to a moving image, the second display data is output for display by bypassing the second memory,
wherein, in the second operation mode, when the second display data corresponds to a still image, the second display data is output for display by storing the second display data in the second memory and subsequently reading the second display data from the second memory.

2. The display driver of claim 1, wherein the plurality of pieces of reference image data include at least one of predetermined symbol images and a plurality of pieces of frame image data including the predetermined symbol images.

3. The display driver of claim 1, wherein a display panel is driven based on the first display data generated by the image generator in the first operation mode, and the display panel is driven based on the second display data received from the host processor in the second operation mode.

4. The display driver of claim 3, further comprising:
a selector configured to receive the first display data and the second display data, select one of the first display data and the second display data based on a selection signal set according to a current operation mode, and output the selected display data,
wherein the selected display data corresponds to an image that is to be displayed on the display panel.

5. The display driver of claim 1, further comprising:
a real time generator configured to generate time information, and provide the time information to the image generator as the display information.

6. The display driver of claim 5, wherein the image generator is configured to generate a watch image corresponding to the time information as the first display data every preset period.

7. The display driver of claim 1, wherein the image generator is configured to read a plurality of pieces of symbol image data corresponding to the display information from the first memory, synthesize the plurality of pieces of symbol image data, and generate the first display data based on the plurality of pieces of symbol image data.

8. The display driver of claim 1, wherein the image generator is configured to read a plurality of pieces of frame image data corresponding to the display information from the first memory, and output the plurality of pieces of frame image data as the first display data.

9. The display driver of claim 1, wherein the image generator is configured to synthesize the second display data received from the host processor and symbol image data read from the first memory, and generate the first display data based on the synthesized second display data and the synthesized symbol image data.

10. The display driver of claim 1, wherein the image generator comprises:
a memory controller configured to access the first memory based on the display information; and
an image synthesizer configured to synthesize the plurality of pieces of reference image data stored in the first memory, and generate the first display data based on the synthesized plurality of pieces of reference image data.

11. The display driver of claim 10, wherein the plurality of pieces of reference image data are compressed and stored in the first memory, and the image generator further comprises an image decoder configured to reconstruct the plurality of pieces of compressed reference image data stored in the first memory.

12. The display driver of claim 1, wherein the display information is provided from the host processor.

13. The display driver of claim 1, wherein the display information is touch information corresponding to a touch detected on a touch panel, and the display information is directly provided from a touch screen controller.

14. The display driver of claim 1, wherein the display information comprises time information, incoming phone call information, weather information, or remaining battery charge information.

15. The display driver of claim 1, wherein a display panel is driven based on the first display data generated by the image generator in the first operation mode, the display panel is driven based on the second display data received from the host processor in the second operation mode, and the host processor operates in a low speed mode or a sleep mode when the display panel is driven in the first operation mode.

16. A display driver, comprising:
- an interface configured to receive a plurality of pieces of reference image data, a command signal, and second display data from a host processor distinct from the display driver;
- a command decoder configured to generate display information and a selection signal indicating a current operation mode based on the command signal;
- a first memory configured to store the plurality of pieces of reference image data;
- a second memory configured to store the second display data provided from the host processor;
- an image generator configured to receive the display information from the command decoder, access the first memory based on the display information, and generate first display data based on at least one piece of reference image data corresponding to the display information from among the plurality of pieces of reference image data stored in the first memory; and
- a selector configured to receive the selection signal from the command decoder, receive the first display data from the image generator, receive the second display data from the second memory, select one of the first display data and the second display data based on the selection signal, and output the selected display data,
- wherein the selected display data corresponds to an image that is to be displayed on a display panel,
- wherein, when the current operation mode is a first operation mode, the interface does not receive any display data from the host processor, and the image generator internally generates the first display data based on the at least one piece of reference image data stored in the first memory,
- wherein the at least one piece of reference image data used to internally generate the first display data in the first operation mode is received by the display driver before a display section,
- wherein, when the current operation mode is a second operation node, the interface receives the second display data from the host processor,
- wherein, when the current operation mode is the second operation mode and the second display data corresponds to a moving image, the second display data is output for display by bypassing the second memory,
- wherein, when the current operation mode is the second operation mode and the second display data corresponds to a still image, the second display data is output for display by storing the second display data in the second memory and subsequently reading the second display data from the second memory.

17. The display driver of claim 16, wherein the image generator comprises:
- a memory controller configured to access the first memory based on the display information; and
- an image synthesizer configured to synthesize the plurality of pieces of reference image data stored in the first memory, and generate the first display data based on the synthesized plurality of pieces of reference image data.

18. The display driver of claim 17, wherein the plurality of pieces of reference image data are compressed and stored in the first memory, and the image generator further comprises an image decoder configured to reconstruct the plurality of pieces of compressed reference image data stored in the first memory.

19. A display driver, comprising:
- an interface configured to receive a command signal indicating an operation mode of the display driver and display data from a host processor distinct from the display driver;
- a first memory configured to store a plurality of pieces of reference image data;
- a second memory configured to store second display data provided from the host processor;
- a real time generator configured to generate time information; and
- an image generator configured to read at least one piece of reference image data from the first memory based on the time information, and generate first display data including the time information based on the at least one piece of reference image data, in response to a first operation mode of the command signal,
- wherein, in the first operation mode, the interface does not receive any display data from the host processor, and the image generator internally generates the first display data based on the at least one piece of reference image data,
- wherein, in a second operation mode, the interface receives the second display data from the host processor,
- wherein, in the second operation mode, when the second display data corresponds to a moving image, the second display data is output for display by bypassing the second memory,
- wherein, in the second operation mode, when the second display data corresponds to a still image, the second display data is output for display by storing the second display data in the second memory and subsequently reading the second display data from the second memory.

* * * * *